US008583400B2

(12) United States Patent
Thrun et al.

(10) Patent No.: US 8,583,400 B2
(45) Date of Patent: Nov. 12, 2013

(54) INDOOR LOCALIZATION OF MOBILE DEVICES

(75) Inventors: Sebastian Thrun, Los Altos Hills, CA (US); Andrew Lookingbill, Palo Alto, CA (US); Mohammed Waleed Kadous, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 251 days.

(21) Appl. No.: 13/107,316

(22) Filed: May 13, 2011

(65) Prior Publication Data
US 2012/0290254 A1 Nov. 15, 2012

(51) Int. Cl.
*G01C 19/00* (2013.01)
(52) U.S. Cl.
USPC ............ 702/150; 702/155; 702/179; 702/189
(58) Field of Classification Search
USPC .................. 707/609; 702/150, 155, 179, 189; 701/454; 455/456.1
See application file for complete search history.

(56) References Cited

U.S. PATENT DOCUMENTS

| | | | |
|---|---|---|---|
| 6,009,359 A | 12/1999 | El-Hakim et al. | |
| 7,069,124 B1 | 6/2006 | Whittaker et al. | |
| 7,312,752 B2 | 12/2007 | Smith et al. | |
| 7,417,544 B2 | 8/2008 | Artem et al. | |
| 7,443,298 B2 | 10/2008 | Cole et al. | |
| 7,460,940 B2 | 12/2008 | Larsson et al. | |
| 7,471,243 B2 | 12/2008 | Roslak | |
| 7,532,113 B2 | 5/2009 | Horvitz et al. | |
| 7,598,865 B2 | 10/2009 | Zhang et al. | |
| 7,620,493 B2 | 11/2009 | Stankiewicz et al. | |
| 7,679,561 B2 | 3/2010 | Elwell, Jr. et al. | |
| 7,791,538 B2 | 9/2010 | Yanagihara | |
| 7,898,977 B2 | 3/2011 | Roese et al. | |
| 8,200,423 B2 | 6/2012 | Dietsch et al. | |
| 8,320,939 B1 | 11/2012 | Vincent | |
| 2002/0055817 A1 | 5/2002 | Chou | |
| 2005/0130677 A1 | 6/2005 | Meunier et al. | |
| 2005/0143091 A1 | 6/2005 | Shapira et al. | |

(Continued)

FOREIGN PATENT DOCUMENTS

| | | |
|---|---|---|
| EP | 2099240 A1 | 9/2009 |
| WO | 2009021068 A1 | 2/2009 |

(Continued)

OTHER PUBLICATIONS

Yiming Ji, Saad Biaz, Santosh Pandey, Prathima Agrawal, Ariadne: A Dynamic Indoor Signal Map Construction and Localization System, Jun. 19, 2006, 14 pages.

(Continued)

*Primary Examiner* — Sujoy Kundu
*Assistant Examiner* — Elias Desta
(74) *Attorney, Agent, or Firm* — Lerner, David, Littenberg, Krumholz & Mentlik, LLP

(57) ABSTRACT

Aspects of the present disclosure relate generally to indoor localization, for example, where GPS or other localization signals are unavailable. More specifically, aspects relate to using a particle filter in conjunction with a gyroscope and/or accelerometer to identify a current location of a client device with respect to a map. In one example, the map may be based upon a map including a series of walls representing locations where a user may not walk within a building. In another example, the map may be based upon a series of rails representing locations where a user may walk within a building.

21 Claims, 23 Drawing Sheets

(56) References Cited

U.S. PATENT DOCUMENTS

| | | |
|---|---|---|
| 2005/0246334 A1 | 11/2005 | Tao et al. |
| 2006/0069526 A1 | 3/2006 | Kaiser et al. |
| 2007/0188318 A1 | 8/2007 | Cole et al. |
| 2007/0271011 A1 | 11/2007 | Lee et al. |
| 2008/0033645 A1 | 2/2008 | Levinson et al. |
| 2008/0161011 A1 | 7/2008 | Babin et al. |
| 2008/0180637 A1 | 7/2008 | Kjeldsen et al. |
| 2008/0255758 A1 | 10/2008 | Graham et al. |
| 2009/0005975 A1 | 1/2009 | Forstall et al. |
| 2009/0023459 A1 | 1/2009 | Wigren |
| 2009/0043504 A1 | 2/2009 | Bandyopadhyay et al. |
| 2009/0102719 A1 | 4/2009 | Lin |
| 2009/0201149 A1 | 8/2009 | Kaji |
| 2009/0291641 A1 | 11/2009 | Sato et al. |
| 2010/0011022 A1 | 1/2010 | Sugimoto et al. |
| 2010/0026569 A1 | 2/2010 | Amidi |
| 2010/0049431 A1 | 2/2010 | Zetune |
| 2010/0070078 A1 | 3/2010 | Kong et al. |
| 2010/0121488 A1 | 5/2010 | Lee et al. |
| 2010/0127935 A1 | 5/2010 | Huang et al. |
| 2010/0159958 A1 | 6/2010 | Naguib et al. |
| 2010/0246405 A1 | 9/2010 | Potkonjak |
| 2010/0279712 A1 | 11/2010 | Dicke et al. |
| 2011/0082638 A1 | 4/2011 | Khorashadi et al. |
| 2011/0211563 A1 | 9/2011 | Herrala et al. |
| 2011/0221897 A1* | 9/2011 | Haddick et al. ............... 348/143 |
| 2012/0086599 A1 | 4/2012 | Mo et al. |
| 2012/0130632 A1* | 5/2012 | Bandyopadhyay et al. .. 701/446 |
| 2012/0290254 A1 | 11/2012 | Thrun et al. |

FOREIGN PATENT DOCUMENTS

| | | | |
|---|---|---|---|
| WO | 2010067348 A1 | 6/2010 | |
| WO | 2010106530 A2 | 9/2010 | |
| WO | 2011042727 A2 | 4/2011 | |

OTHER PUBLICATIONS

Adam Milstein, Occupancy Grid Maps for Localization and Mapping, Jun. 2008, 28 pages.

Siddhartha Saha, Kamalika Chaudhuri, Dheeraj Sanghi, Pravin Bhagwat, Location Determination of a Mobile Device Using IEEE 802.11b Access Point Signals, 2003, 6 pages.

Paramvir Bahl and Venkata N. Padmanabhan, Radar: An In-Building RF-Based User Location and Tracking System, 2008, 10 pages.

M. Sanjeev Arulampalam, Simon Maskell, Neil Gordon, and Tim Clapp, a Tutorial on Particle Filters for Online Nonlinear/Non-Gaussian Bayesian Tracking, 2002, 15 pages.

"Kidnapped Robot Problem" [online]. [Retrieved Feb. 16, 2011] Retrieved from the Internet: <http://en.wikipedia.org/wiki/Kidnapped_robot_problem, 1 page.

Lasse Klingbeil and Tim Wark, A Wireless Sensor Network for Real-Time Indoor Localisation and Motion Monitoring, 2008, 12 pages, IEEE Computer Society.

Juan D. Tardos, Jose Neira, Maria De Luna, Paul M. Newman, John J. Leonard, Robust Mapping and Localization in Indoor Environments Using Sonar Data, Jun. 24, 2002, 39 pages.

International Search Report and Written Opinion for Application No. PCT/US2012/037235 dated Aug. 29, 2012.

International Search Report and Written Opinion dated Nov. 23, 2012, in International Application No. PCT/US2012/037259.

Chunwang Gao, Zhen Yu, Yawen Wei, Steve Russell, and Yong Guan, "A Statistical Indoor Localization Method for Supporting Location-based Access Control", Apr. 2009, Mobile Networks and Applications, vol. 14, Issue 2, pp. 253-263.

* cited by examiner

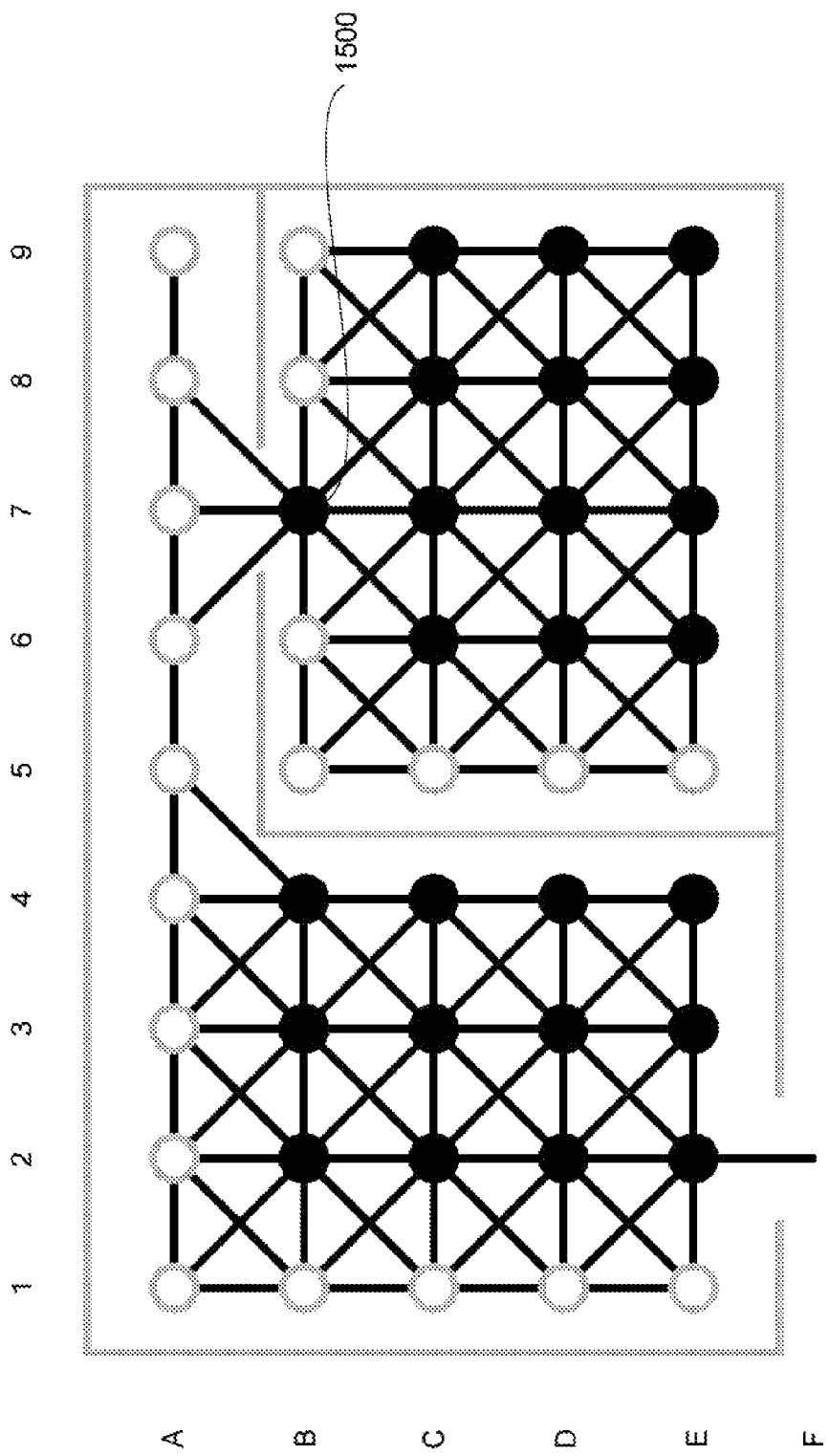
FIGURE 15

2000

```
┌─────────────────────────────────────────┐
│ Identify a map of an indoor location    │
│ including a plurality of rails defining │
│ possible paths within the indoor        │
│ 2002              location              │
└─────────────────────────────────────────┘
                   ↓
┌─────────────────────────────────────────┐
│ Populate the map with a plurality of    │
│ particles, each particle representing a │
│ possible location of a client device    │
│ along the rails and being associated    │
│ 2004        with a likelihood value     │
└─────────────────────────────────────────┘
                   ↓
┌─────────────────────────────────────────┐
│        Receive data from a gyroscope    │
│ 2006                                    │
└─────────────────────────────────────────┘
                   ↓
┌─────────────────────────────────────────┐
│ Determine a heading and a speed of      │
│ movement based on the gyroscope data    │
│ 2008                                    │
└─────────────────────────────────────────┘
                   ↓
┌─────────────────────────────────────────┐
│ Apply the determined heading and speed  │
│ to each of the [remaining] plurality of │
│ 2010             particles              │
└─────────────────────────────────────────┘
                   ↓
┌─────────────────────────────────────────┐
│ Adjust the likelihood value associated  │
│ with each particle based on whether the │
│ 2012       particle went off of a rail  │
└─────────────────────────────────────────┘
                   ↓
┌─────────────────────────────────────────┐
│ Remove one or more particles associated │
│ with likelihood values below a threshold│
│ 2014              value                 │
└─────────────────────────────────────────┘
                   ↓
            ╱ 2016          ╲
     YES   ╱ More than one   ╲
  ←───────(  particle         )
            ╲ remaining?     ╱
             ╲              ╱
                   ↓ No
┌─────────────────────────────────────────┐
│ Determine an actual location of the     │
│ client device based on the possible     │
│ location represented by the remaining   │
│ 2018             particle               │
└─────────────────────────────────────────┘
```

FIGURE 20

INDOOR LOCALIZATION OF MOBILE DEVICES

BACKGROUND

Various navigation systems provide users with turn-by-turn directions. These systems include handheld GPS devices, mobile phones, or vehicle-mounted devices. A user inputs one or more locations and receives a route and turn-by-turn directions based on the inputted locations. The user may follow the turn-by-turn directions to reach the one or more locations.

These navigation systems rely on the ability to receive information from a plurality of GPS satellites. This allows for identification of a current location of a device for providing navigational assistance. However, while indoors, a mobile device may require accurate localization to enable features such as advanced indoor navigation, for example, to conference rooms in a building or stores within a mall. In an indoor environment, accurate localization is difficult due to the lack of adequate signals from the GPS satellites.

In the field of robotics, particle filters or other probabilistic approaches may be used to identify the location of a robot which has no information regarding its location other than a map. This is generally referred to as the "kidnapped robot problem." These robots use sophisticated cameras and lasers to take measurements. These measurements are used in conjunction with the particle filter to reduce the number of possible map locations until only a single possible location is left. However, while many modern smart phones incorporate a significant amount of technological advancements, they typically do not include the sophisticated cameras and lasers generally utilized to solve the kidnapped robot problem.

SUMMARY

Aspects of the present disclosure relate generally to indoor localization, for example, where GPS or other localization signals are unavailable. More specifically, aspects relate to using a plurality of particles in conjunction with a device used to identify the orientation of a client device to identify a current location of the client device with respect to a map including a plurality of constraints. In one example, the map may be based a series of walls representing locations where a user may not walk within a building. In another example, the map may be based upon a series of rails representing locations where a user may walk within a building.

One aspect of the disclosure provides a method of determining a location of a portable handheld device in an indoor space. The method includes generating, by a processor, a first set of particles. Each particle of the first set of particles represents a location on the map and is associated with a likelihood value. The method also includes receiving data from an orientation device including a gyroscope; determining a direction and speed of movement based on the received data; applying the direction and speed of movement to each one of the first set of particles; adjusting the likelihood value of each particular particle of the first set of particles, based on whether the particular particle violated one or more of the plurality of constraints; generating a second set of particles based on the likelihood values associated with the first set of particles; if all of the particles of the second set of particles are within a threshold radius of one another, selecting a particular particle of the second set of particles closest to an average representative location of the second set of particles; and identifying an actual location of the portable handheld device in the indoor space based on a representative location of the selected particle.

In one example, the plurality of constraints are walls which define areas where a user may not walk. In another example, the plurality of constraints are rails which define areas where a user is permitted to walk. In yet another example, the map is associated with a direction indicator, and wherein applying the direction and speed of movement to each of the particles of the plurality of particles is based on the direction indicator. In a further example, each particle of the first set of particles also represents a device heading, and the method also includes identifying a heading based on the received data and wherein adjusting the likelihood value of each particular particle of the first set of particles is also based whether the heading associated with each particular particle is associated with a heading consistent with the identified heading. In yet another example, the method also includes identifying the representative heading of the selected particular particle as an actual heading of the client device. In a further example, the orientation device also includes a compass. In another example, the orientation device also includes an accelerometer. In yet another example, determining the direction and speed of movement is based on the received data is also based on using the accelerometer as a pedometer. In another example, the first set of particles and the second set of particles each includes the same number of particles. In another example, the second set of particles is generated by selecting particles of the first set of particles based on the likelihood values associated with the first set of particles and adjusting the representative locations of the selected particles by a minimal value. In yet another example, each particle of the first set of particles also represents a device heading, and the method also includes identifying a heading based on the received data and adjusting the likelihood value of each one of the first set of particles based on whether the heading associated with each particle is associated with a heading consistent with the identified heading and wherein the second set of particles is generated by adjusting each of the representative headings of the selected particles of the first set of particles by a minimal heading value. In another example, the second set of particles is generated by removing particles from the first set of particles based on whether the likelihood values associated with the first set of particles meet a minimum likelihood threshold value.

Another aspect of the disclosure provides a device for determining a location of a portable handheld device in an indoor space. The device includes memory storing a map of an indoor space. The map is based on a plurality of constraints. The device also includes a processor coupled to the memory. The processor is operable to generate a first set of particles, each particle of the first set of particles representing a location on the map and being associated with a likelihood value; receive data generated by an orientation device; determine a direction and speed of movement based on the received data; apply the direction and speed of movement to each one of the first set of particles; adjust the likelihood value of each particular particle of the first set of particles, based on whether the particular particle violated one or more of the plurality of constraints; generate a second set of particles based on the likelihood values associated with the first set of particles; if all of the particles of the second set of particles are within a threshold radius of one another, select a particular particle of the second set of particles closest to an average representative location of the second set of particles; and identify an actual location of the portable handheld device in the indoor space based on a representative location of the selected particle.

In one example, the plurality of constraints are walls which define areas where a user may not walk. In another example, the plurality of constraints are rails which define areas where a user is permitted to walk. In yet another example, each particle of the first set of particles also represents a device heading, and the processor is also operable to identify a heading based on the received data and adjusts the likelihood value of each particular particle of the first set of particles based on whether the heading associated with each particular particle is associated with a heading consistent with the identified heading. In a further example, the processor is further operable to determine the direction and speed of movement based on the received data is further based on using the accelerometer as a pedometer. In another example, the first set of particles and the second set of particles each includes the same number of particles. In yet another example, the processor is further operable to generate the second set of particles by selecting particles of the first set of particles based on the likelihood values associated with the first set of particles and adjusting the representative locations of the selected particles by a minimal value. In a further example, each particle of the first set of particles also represents a device heading, and the processor is also operable to identify a heading based on the received data and adjust the likelihood value of each one of the first set of particles based on whether the heading associated with each particle is associated with a heading consistent with the identified heading and wherein the second set of particles is generated by adjusting each of the representative headings of the selected particles of the first set of particles by a minimal heading value.

BRIEF DESCRIPTION OF THE DRAWINGS

FIG. 15 is yet another map of the indoor space in accordance with an exemplary embodiment.

FIG. 20 is a flow diagram in accordance with exemplary embodiment.

DETAILED DESCRIPTION

In one aspect, a map of an indoor location may include a plurality of constraints. These constraints may include, for example walls or rails. The walls may represent locations where a user may not walk within a building, while the rails may represent possible paths within the indoor location.

The map is populated with a plurality of particles. Each particle represents a state of the client device, for example a possible location of the client device with respect to the map. Data is received from a device for determining the direction in which the client device is oriented such as a gyroscope, accelerometer, and/or compass. The data is used to determine a heading and speed of movement. The determined heading and speed are applied to each of the plurality of particles. Particles that would violate a constraint, for example contacting a wall or moving off or away from the rails, may be removed. As the client device continues to move and accelerometer data is received, the particles may continue to be removed. Once only a single particle remains, that particle may be used to determine the current location of the client device. For example, the possible location represented by the remaining particle may be determined to be the current location of the client device.

Figure 1:
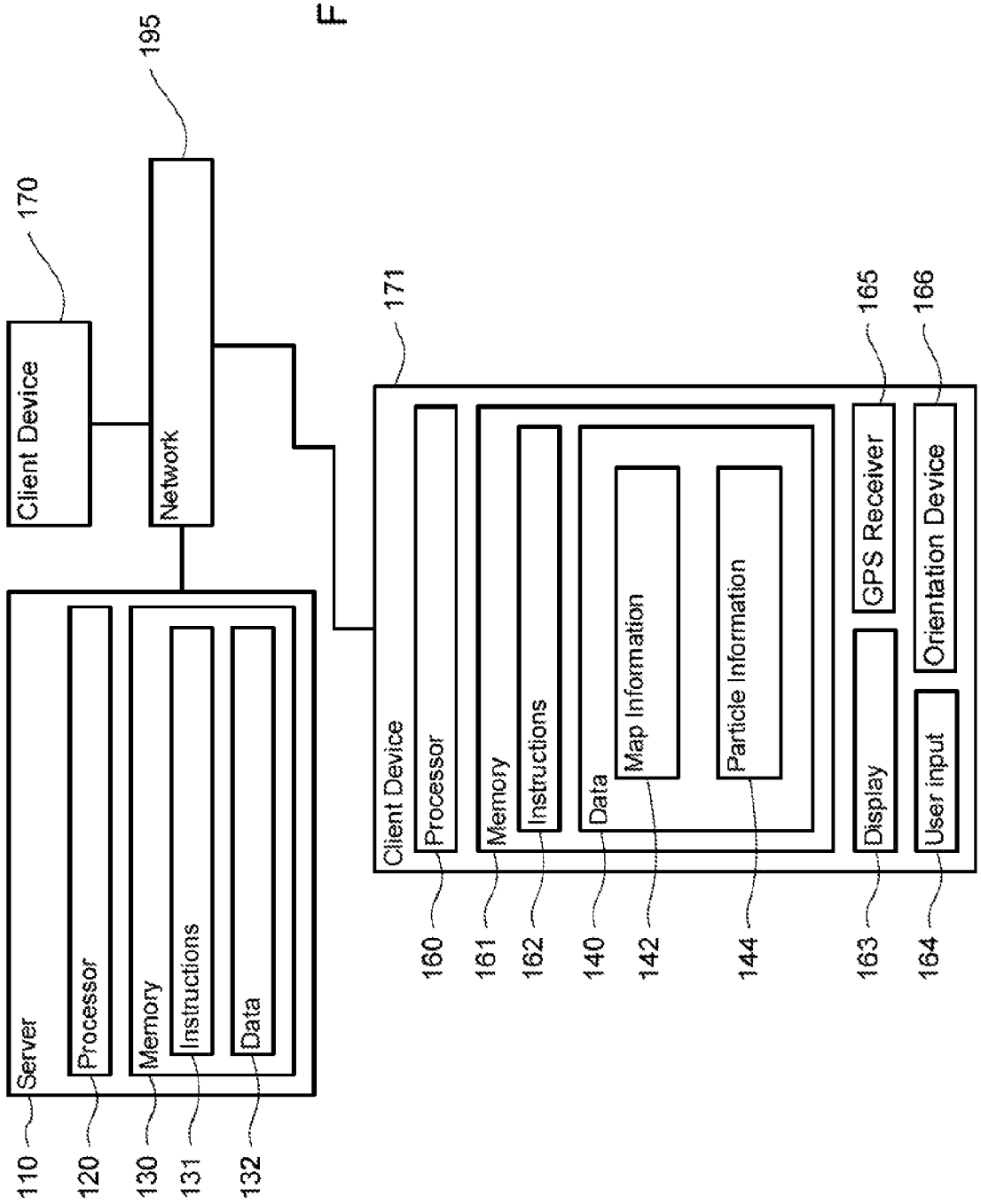
FIG. 1 is a functional diagram of a system in accordance with an exemplary embodiment.
Figure 2:
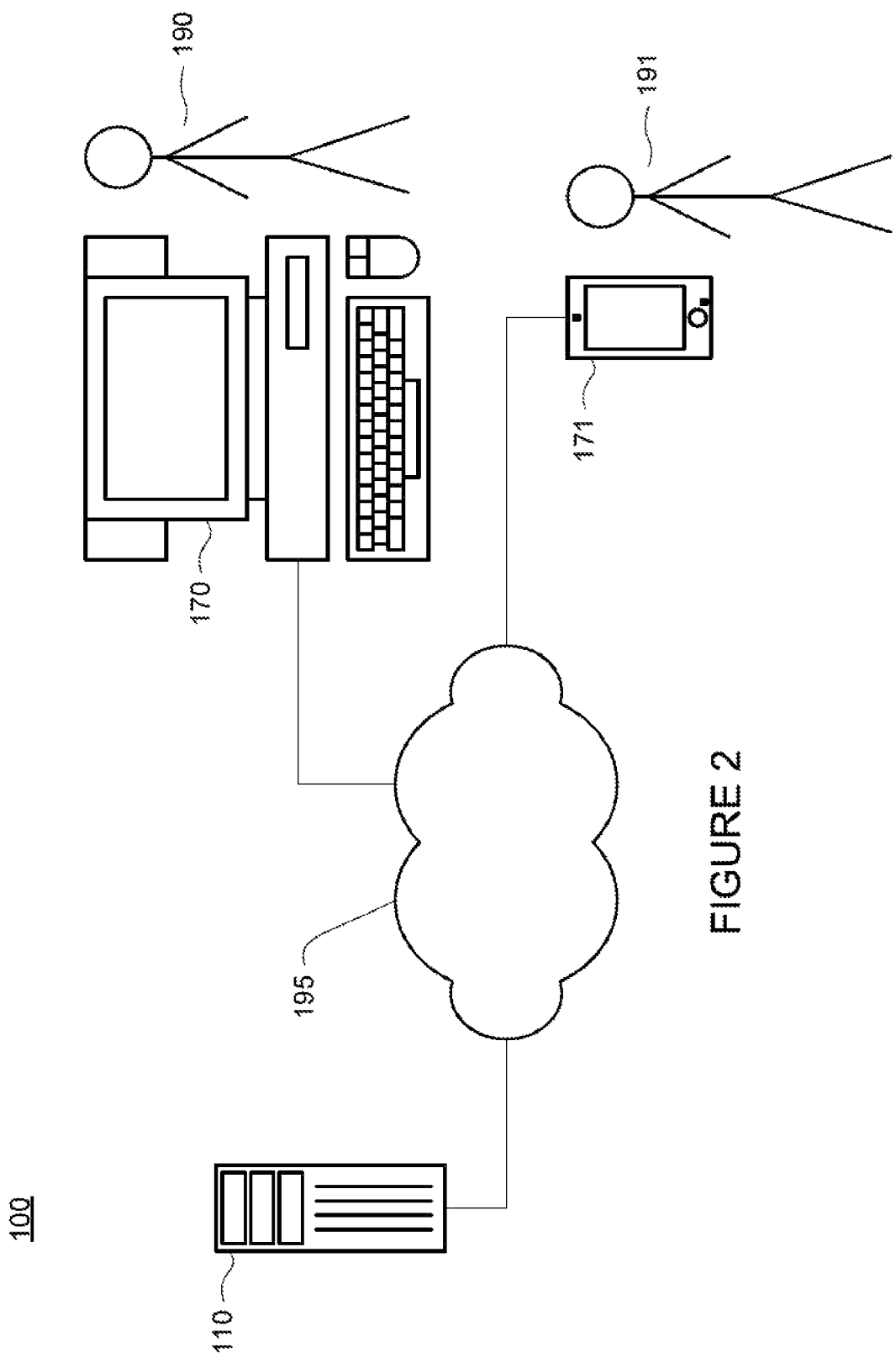
FIG. 2 is a pictorial diagram of a system in accordance with an exemplary embodiment.

As shown in FIGS. 1-2, an exemplary system 100 may include computers 110, 170, and 171. Computer 110 may contain a processor 120, memory 130 and other components typically present in general purpose computers.

Memory 130 of computer 110 stores information accessible by processor 120, including instructions 131 that may be executed by the processor 120. Memory also includes data 132 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 120 may be any well-known processor, such as processors from Intel Corporation or Advanced Micro Devices. Alternatively, the processor may be a dedicated controller such as an ASIC.

The instructions 131 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 132 may be retrieved, stored or modified by processor 120 in accordance with the instructions 131. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

Although FIG. 1 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

The computer 110 may be at one node of a network 195 and capable of directly and indirectly communicating with other nodes of the network. For example, computer 110 may comprise a web server that is capable of communicating with client devices 170-71 via network 195 such that server 110 uses network 195 to transmit and display information to user 190 on display of client device 170. Server 110 may also comprise a plurality of computers, e.g., a load balanced server farm, that exchange information with different nodes of a network for the purpose of receiving, processing and transmitting data to the client devices. In this instance, the client devices will typically still be at different nodes of the network than any of the computers comprising server 110.

Each client device may be configured similarly to the server 110, with a processor 160, memory 161, instructions 162, and data 140. Each client computer 170-71 may be a personal computer, intended for use by a person 190-91, having all the internal components normally found in a personal computer such as a central processing unit (CPU), display device 163 (for example, a monitor having a screen, a projector, a touch-screen, a small LCD screen, a television, or another device such as an electrical device that is operable to display information processed by the processor), CD-ROM, hard-drive, user input 164 (for example, a mouse, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, PDAs, network computers lacking local storage capability, set-top boxes for televisions, and other networked devices.

Although the computers 170-71 may comprise a full-sized personal computer, the system and method may also be used in connection with mobile devices capable of wirelessly exchanging data with a server over a network such as the Internet. By way of example only, client device 171 may be a wireless-enabled PDA, hand-held or in-car navigation device, tablet PC, netbook, or a cellular phone capable of obtaining information via the Internet. The user may input information, for example, using a small keyboard, a keypad, or a touch screen.

The server 110 and client computers 170-71 are capable of direct and indirect communication, such as over network 195. Although only a few computers are depicted in FIGS. 1-2, it should be appreciated that a typical system can include a large number of connected computers, with each different computer being at a different node of the network 195. The network, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), and HTTP, and various combinations of the foregoing. Such communication may be facilitated by any device capable of transmitting data to and from other computers, such as modems (e.g., dial-up, cable or fiber optic) and wireless interfaces.

Although certain advantages are obtained when information is transmitted or received as noted above, other aspects of the system and method are not limited to any particular manner of transmission of information. For example, in some aspects, information may be sent via a medium such as a disk, tape or CD-ROM. Yet further, although some functions are indicated as taking place on a single client device having a single processor, various aspects of the system and method may be implemented by a plurality of computers, for example, communicating information over network 195.

As shown in FIG. 1, the client devices may also include geographic position component 165, to determine the geographic location. For example, client device 170 may include a GPS receiver to determine the device's latitude, longitude and altitude position. Thus, as the client device changes location, for example by being physically moved, the GPS receiver may determine a new current location. The component 165 may also comprise software for determining the position of the device based on other signals received at the client device 170, such as signals received at a cell phone's antennas from one or more cell phone towers if the client device is a cell phone.

Client device 171 may also include an orientation device 166, such as an accelerometer, gyroscope, compass, software, or any combination of these, to determine the direction in which the device is oriented. For example, an accelerometer may be used to detect the effect of gravity on the client device measured, for example, in meters per second per second. By way of example only, the client device may use input from the accelerometer to determine the client device's pitch, yaw or roll (or changes thereto) relative to the direction of gravity or a plane perpendicular thereto. In that regard, it will be understood that a client device's provision of orientation data as set forth herein may be provided automatically to the client device.

The orientation data received from the orientation device may be used in various ways. For example, an accelerometer or gyroscope may be used as a pedometer by running an average of the acceleration values to identify which direction is down (towards the Earth). A simple step detector may be constructed by deciding a step has been taken each time the component in the down direction is greater than an empirically-determined threshold.

The client device may access map information 142. This map information may be stored locally at the client device. Alternatively, no map information or only a portion of the map information may be stored locally at the client device while the bulk of the map information is maintained by the server. In this example, any additional map information may be requested from the server as needed. As described in more detail below the map information may include a series of maps representing the spaces within a building. In one example, the map information may be based upon a series of walls representing locations where a user may not walk (or is not able to walk) within a building. In another example, the map information may be based upon a series of rails representing locations where a user may walk within a building.

The client device may also access particle information 144. The particle information may include a plurality of particles. Each particle may be associated with state information corresponding to a possible state of the client device. For example, a particular particle may be associated with an identifier, a location coordinate, and heading information. As described in more detail below, the client device may manipulate the state information based upon information received from an accelerometer, compass, pedometer, etc.

In addition to the operations described below and illustrated in the figures, various operations will now be described. It should also be understood that the following operations do not have to be performed in the precise order described below. Rather, various steps may be handled in a different order or simultaneously. Steps may also be omitted unless otherwise stated.

WALLS EXAMPLE

Figure 3:
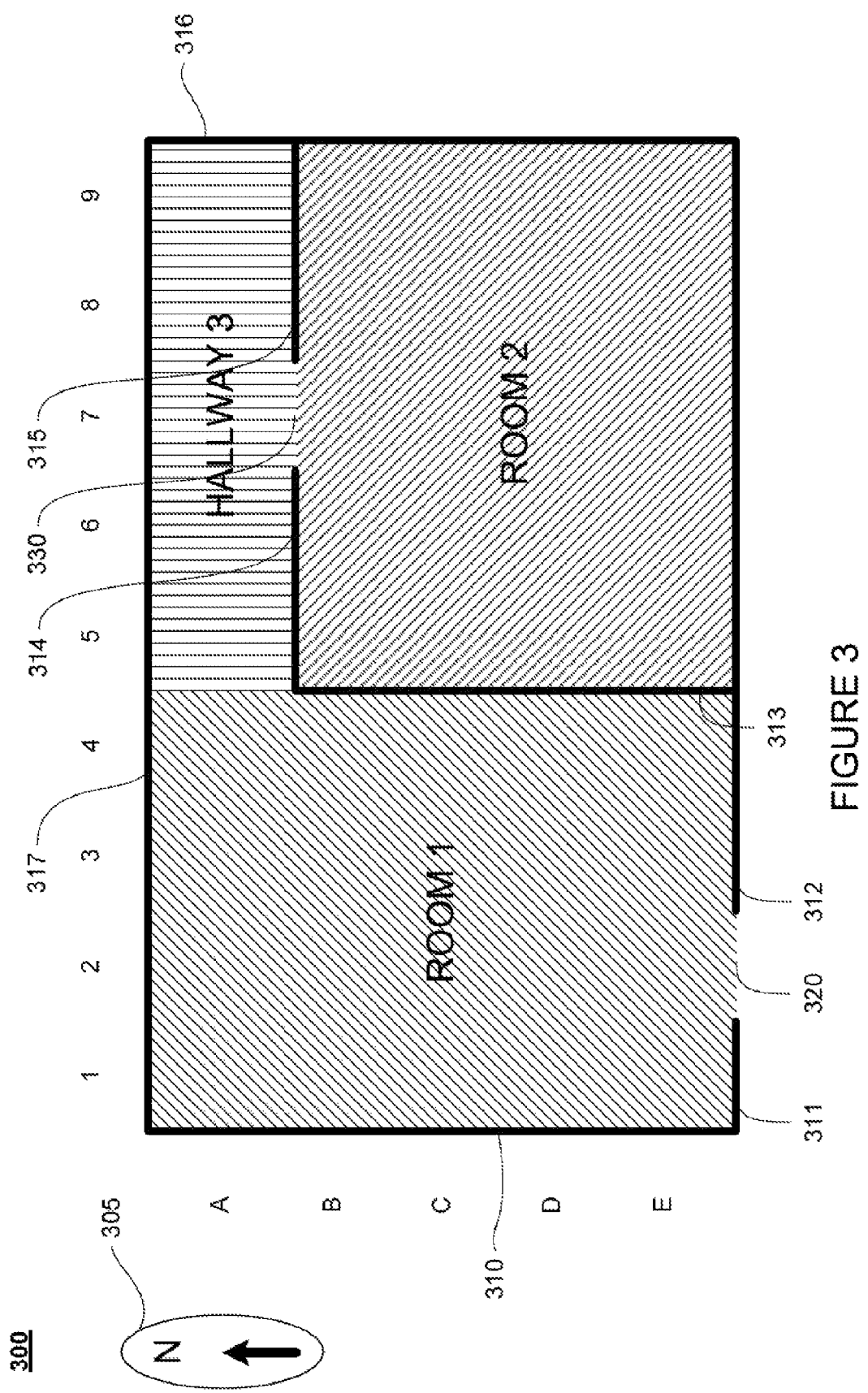
FIG. 3 is a map of an indoor space in accordance with an exemplary embodiment.

A client device may be located within a building and unable to obtain a GPS fix. In response, the client device may access a map of the indoor space. As noted above, the map may include a series of walls representing locations where a user may not walk within a building. As shown in FIG. 3, map 300 may include a plurality of walls 310-317 defining the spaces, such as rooms 1 and 2 and hallway 3, in which a user may walk (or rather in which a client device may be located), entrance/exit 320, and doorway 330. In this example, the map may include a coordinate system, A-E and 0-9, where the distance between coordinates of the same axis represent 1 meter. The map may also include a map pointer 305 which indicates the orientation of the map.

Figure 4:
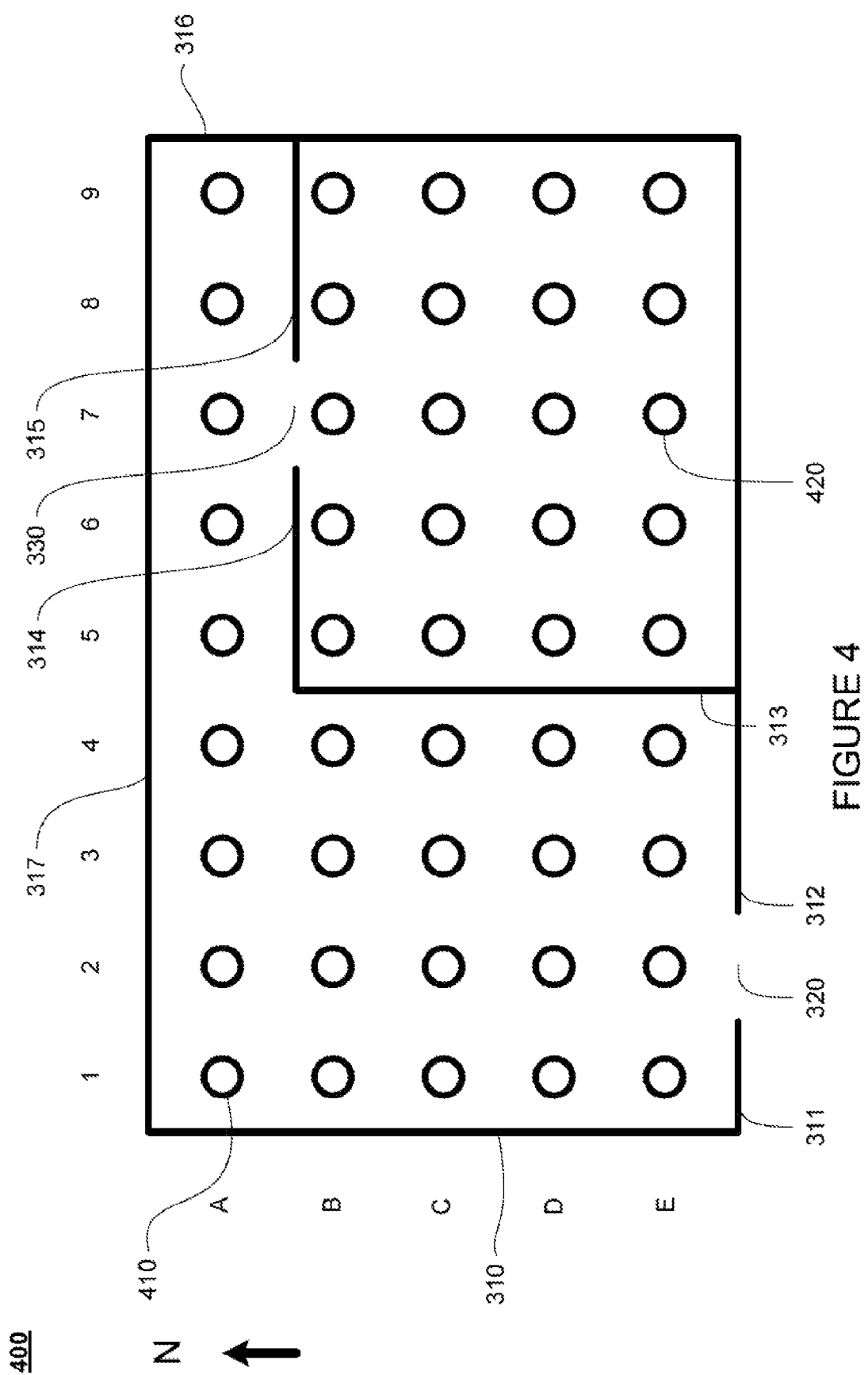
FIG. 4 is another map of the indoor space in accordance with an exemplary embodiment.

The client device may populate the map with particles. Each particle may represent a possible location of the client device. It will be understood that a map need not actually be "filled" with particles. The particles may simply be generated as a list or table of data points each representing a possible location of the client device and various other attributes. As shown in FIG. 4, map 400 includes a plurality of particles, each representing a map coordinate at which the client device could be located and a value indicative of the likelihood that the client device is at that particular map coordinate (a "likelihood value"). For example, particle 410 represents map coordinate A1 and particle 420 represents map coordinate E7.

It will be understood that the number, size, and placement of the particles of FIG. 4 is merely exemplary. The greater the number of particles used, the greater the level of accuracy of the location estimation. In addition, larger spaces may require a greater number of particles. For example, particles may be generated in a ratio of roughly 2 particles per square foot thus a space of roughly 500 square feet may be populated with 1000 particles, whereas another space of roughly 300 square feet may be populated with 600 particles. Further, each particle may represent a point or an area (1 square foot), etc.

Again, although FIG. 4 depicts the particles as evenly dispersed throughout map 400, the particles may be arranged in various ways. For example, particles may be assigned locations randomly or clumped together in locations where an individual is most likely to be located. Returning to FIG. 3, more particles per some area (square foot or meter, etc.) may be associated with locations in room 1 (a large open space) as opposed to hallway 2 (a long narrow hallway). Similarly, more particles per some area may be located towards the center of room 2 as towards the outer edge of room 2 (along the walls 312-316.)

As the use walks or moves around an indoor space, the user's movements may be tracked by way of a device for detecting the orientation of the client device. For example, as described above, the accelerometer or gyroscope may be used as a pedometer to determine when the user is moving. Accordingly, the client device may be able to estimate the heading and speed of the client device based on information from the orientation device.

After determining the user's movements based on the data from the orientation device, the effect of the movements on each of the particles may be determined. In one example, shown in FIGS. 5-11, each time a particle violates some constraint associated with the map, the value associated with the particle may be adjusted such that the value is below some threshold, and as a result, the particle is removed.

Figure 5:
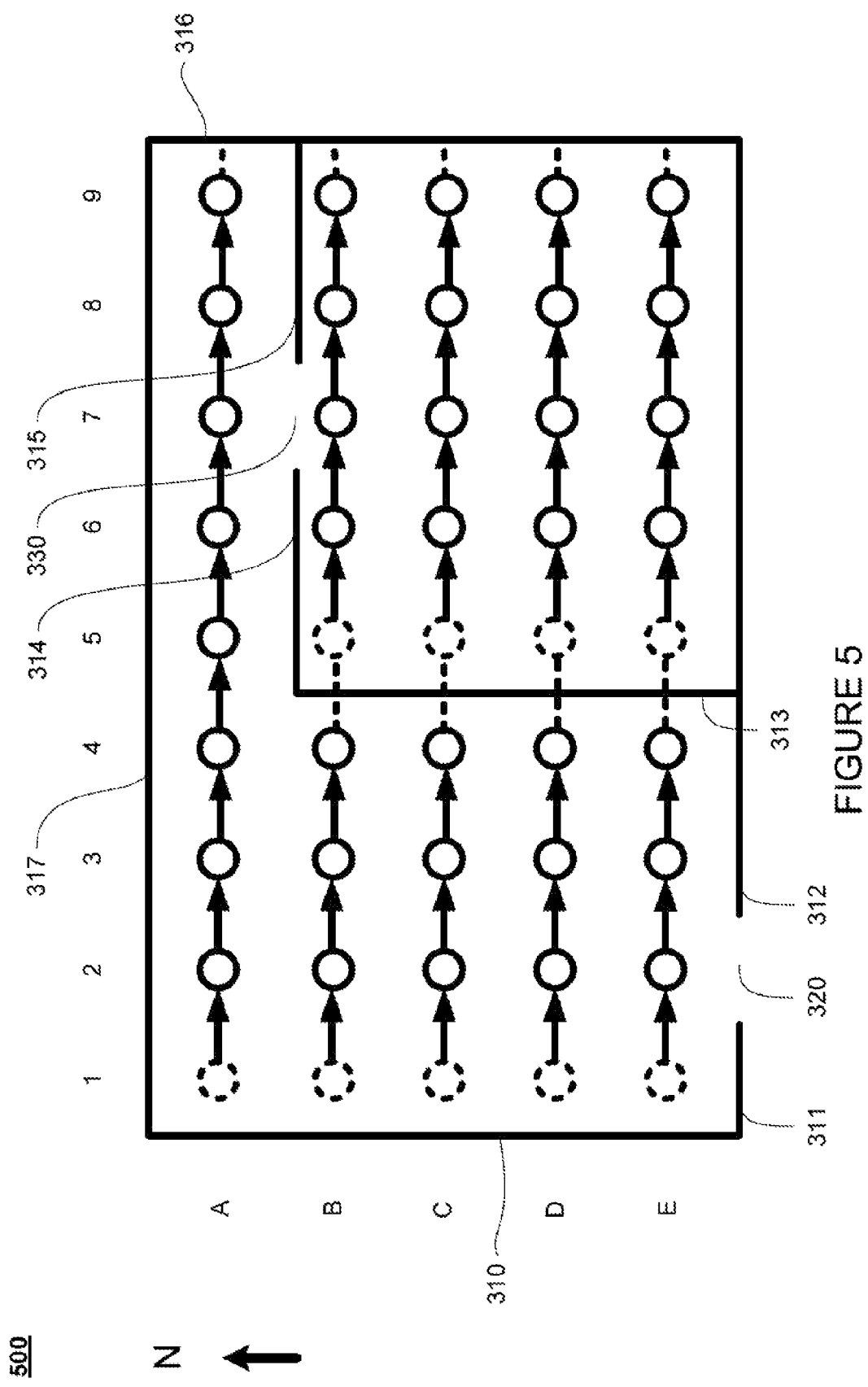
FIG. 5 is yet another map of the indoor space in accordance with an exemplary embodiment.

For example, as shown in map 500 of FIG. 5, if the client device has moved east 1 meter, each particle may be "moved" east 1 meter. Thus, the particle representing A1 may be "moved" to location A2, or rather the particle's representative location may be changed. As no particle moving meter to the east would be moved into location A1, this location is no longer represented by a particle, and show in the figure in broken line format.

After each particle is "moved" based on the direction and speed of movement of the client device, the likelihood values may be adjusted based on whether the particle has run into a wall. For example, if a particle at location B4 is moved 1 meter to the east, the particle would run into wall 313. The particle's likelihood value may be adjusted, for example, reduced.

Each particle's likelihood value may then be compared to a threshold value. In one example, if any particular particle's likelihood value falls below the threshold value, the particle may be removed. For clarity, if the particles are "moved" 1 meter to the east, the particle previously at location B4 will have moved through wall 313 and its associated likelihood value may be reduced, for example, below the threshold value. Accordingly, as shown in FIG. 5, location B5 is no longer represented by a particle. Similarly, B1, C1, D1, and E1 are also shown in broken line as these locations are no longer represented by particles for the same reason.

Figure 6:
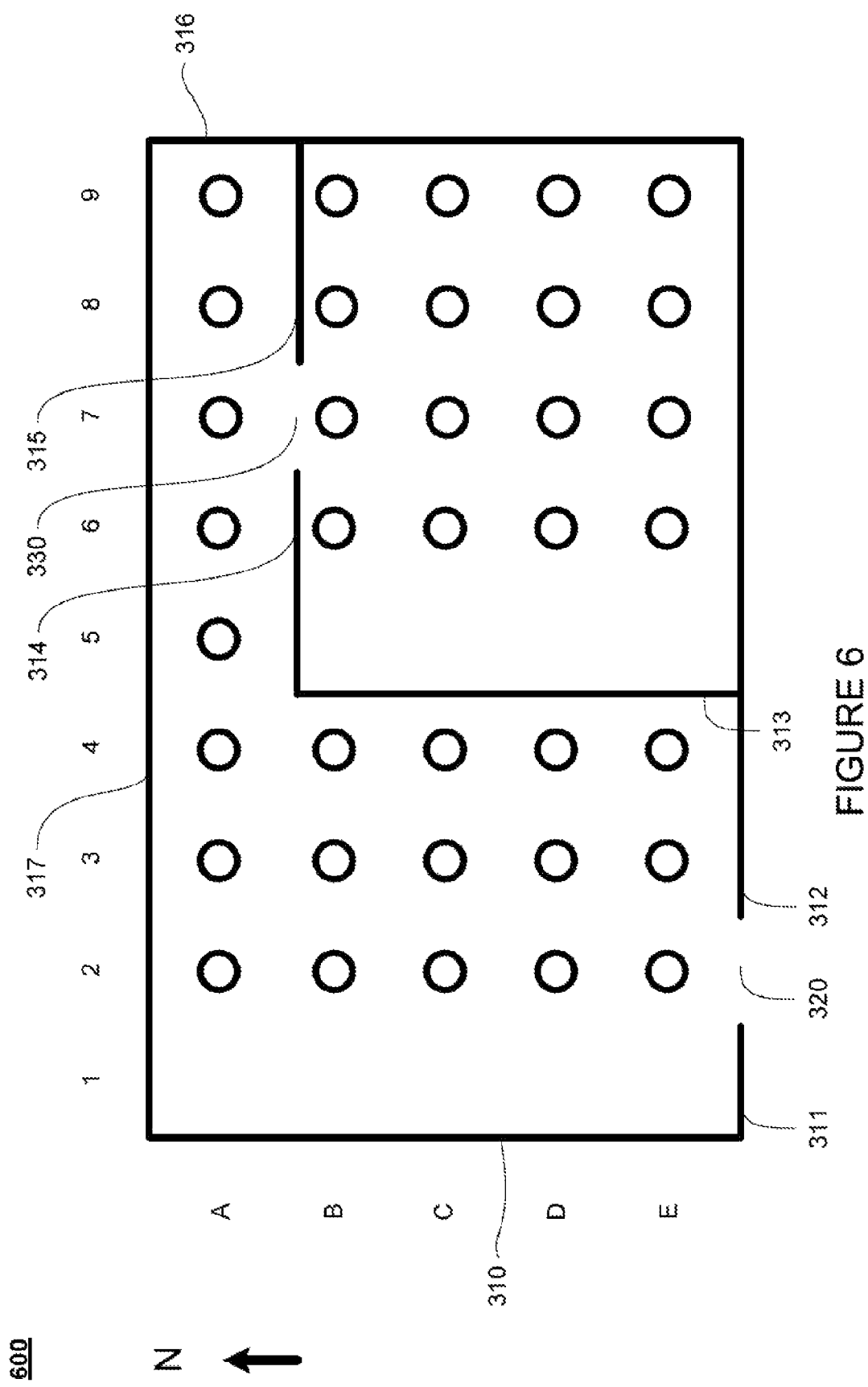
FIG. 6 is still another map of the indoor space in accordance with an exemplary embodiment.
Figure 7:
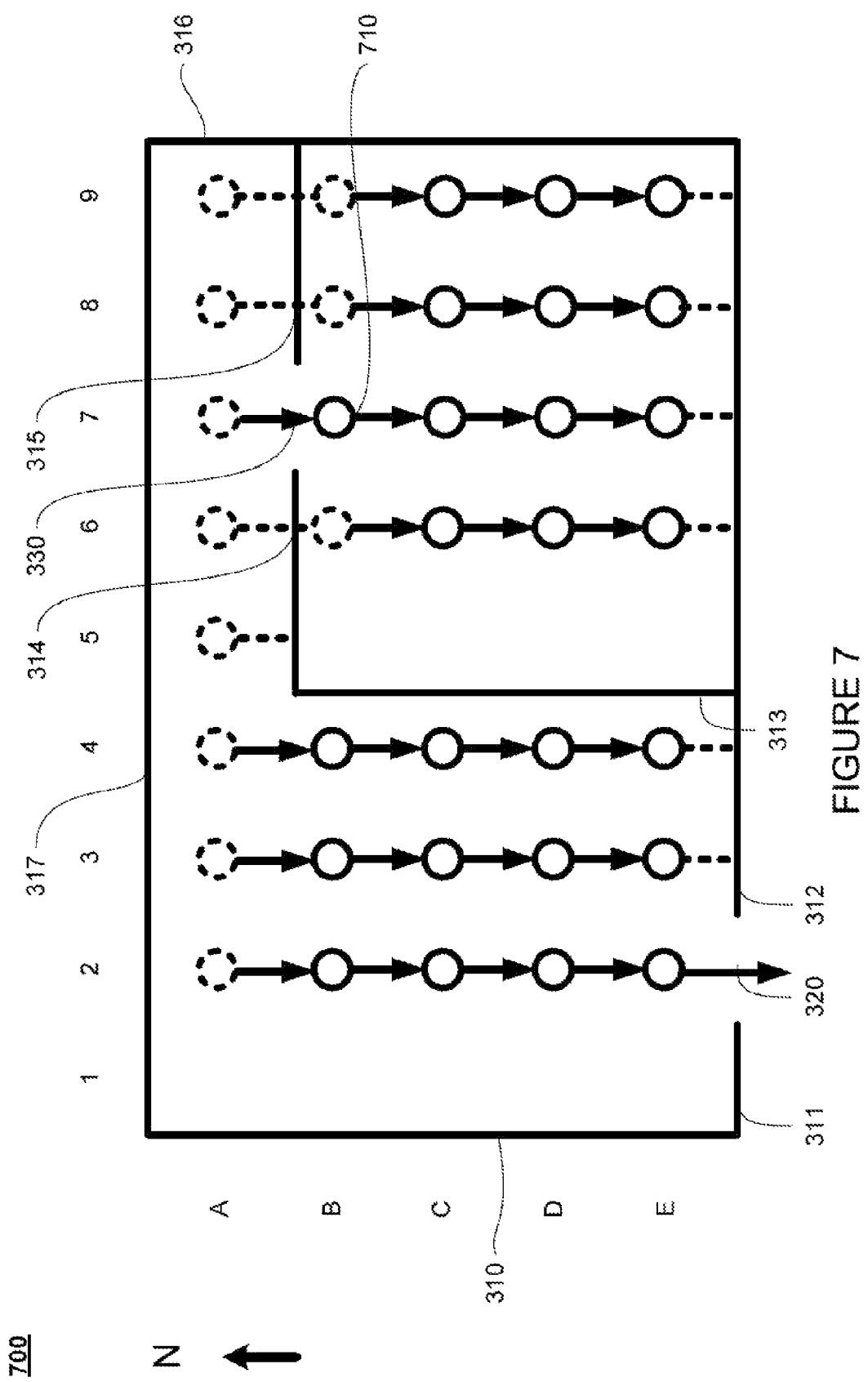
FIG. 7 is a further map of the indoor space in accordance with an exemplary embodiment.

For clarity, map 600 of FIG. 6 depicts the remaining particle locations after the particles located at A1, B1, C1, D1, E1, B2, C2, D2, and E2 have been removed as their likelihood values will have been reduced below the threshold value.

Again, as the user continues to move, the client device may continue to determine the heading and speed of its movements. As shown in map 700 of FIG. 7, if the client device changes direction and moves 1 meter south, each of the particles may be "moved" to reflect the movement of the client device. Those particles that would run into a wall, such as wall segments 312, 314 or 316, may be removed as their likelihood values will have been reduced below the threshold value. Accordingly, the particles at locations A2, A3, A4, A5, A6, A7, A8, A9, B6, B8, and B9 are shown in dotted line in FIG. 7.

If a particle at location E2 is moved 1 meter south, the particle will have moved through entrance/exit 320. If this particle were to represent the actually current location of the client device, the client device would have moved through entrance/exit 320. Accordingly, the client device would then be outside of the building. Once outside, the client device would be able to receive GPS signals. The GPS signals may be used to identify a current location of the client device. Accordingly, the client device may determine that it is no longer within the building and continue to determine its current location based on the GPS signals.

Figure 8:
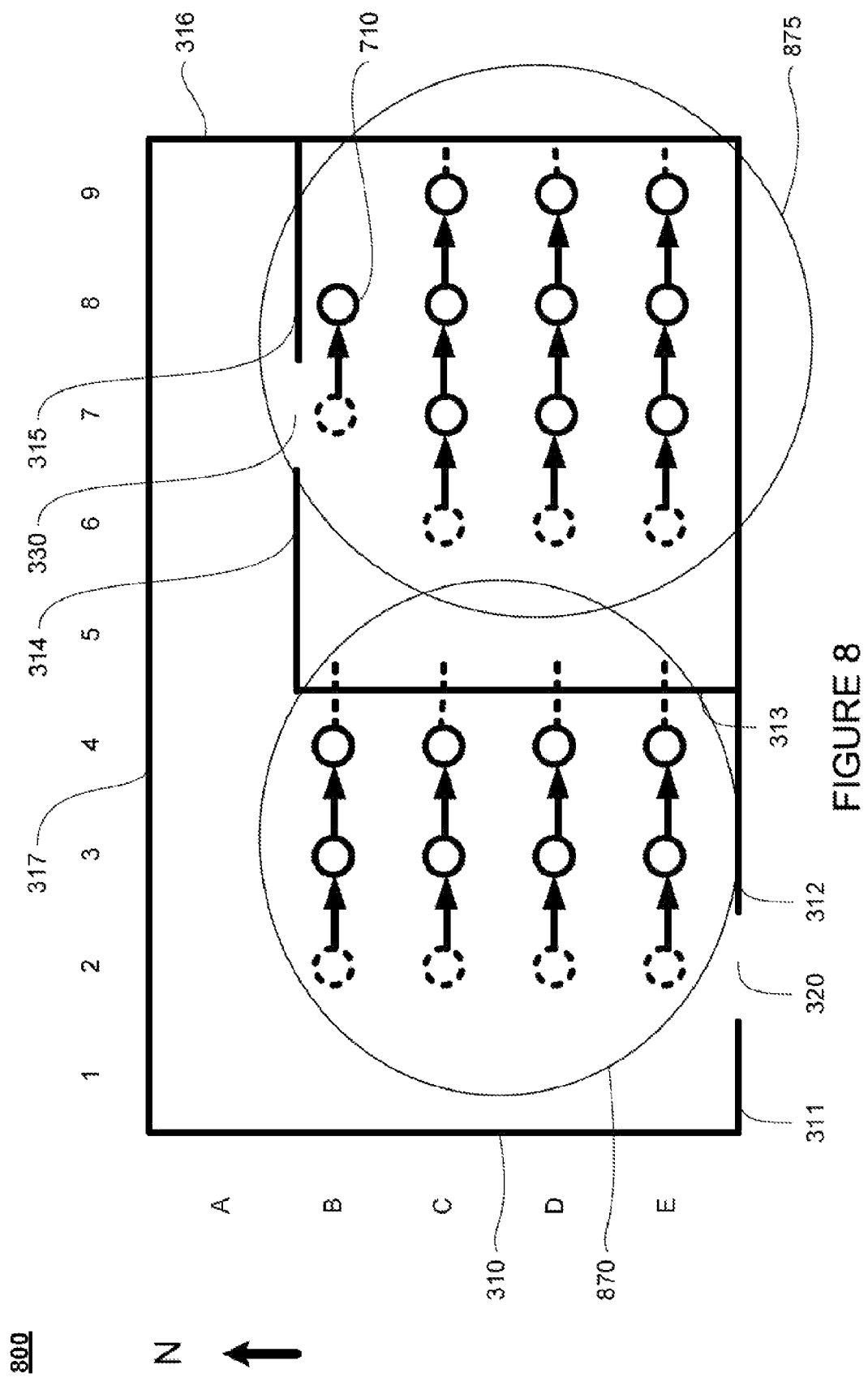
FIG. 8 is yet a further map of the indoor space in accordance with an exemplary embodiment.
Figure 9:
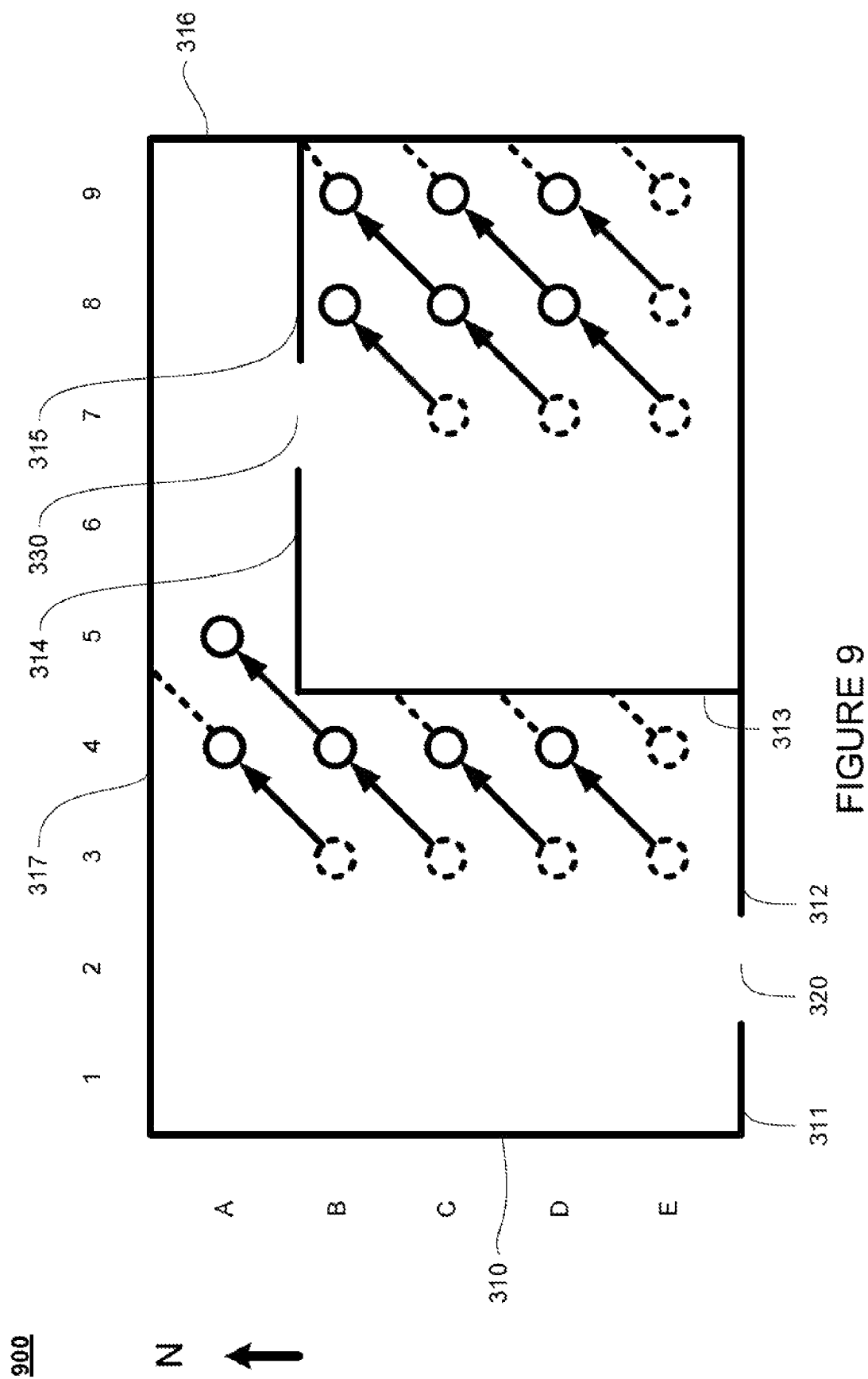
FIG. 9 is still a further map of the indoor space in accordance with an exemplary embodiment.

If the client device has not left the building continues to move within the building, particles may continue to be removed. Thus, as shown in FIG. 8, moving another meter to the east will result in the elimination of additional particles as these particles would run into a wall and their likelihood values will have been reduced below the threshold value. Returning to FIG. 7, after moving 1 meter south, there is no longer a particle representing location B8. However, once the user moves 1 meter to the east, as shown in map 800 of FIG. 8, particle 810 now represents this location.

The client device need not move only in the cardinal directions. Rather, the user may move in various directions. However, if the movements would result in particles running into walls of the map, these particles may also be removed. For example, as shown in map 900 of FIG. 9, the client device has moved approximately 1.4 meters northeast. As a result, the particles are also moved approximately 1.4 meters northeast. Again, particles that would run into walls may be removed as their likelihood values will have been reduced below the threshold value. As shown in map 1000 FIG. 10, the use has moved approximately 1.4 meters southeast. Again, particles that would run into walls may be removed as their likelihood values will have been reduced below the threshold value.

Figure 11:
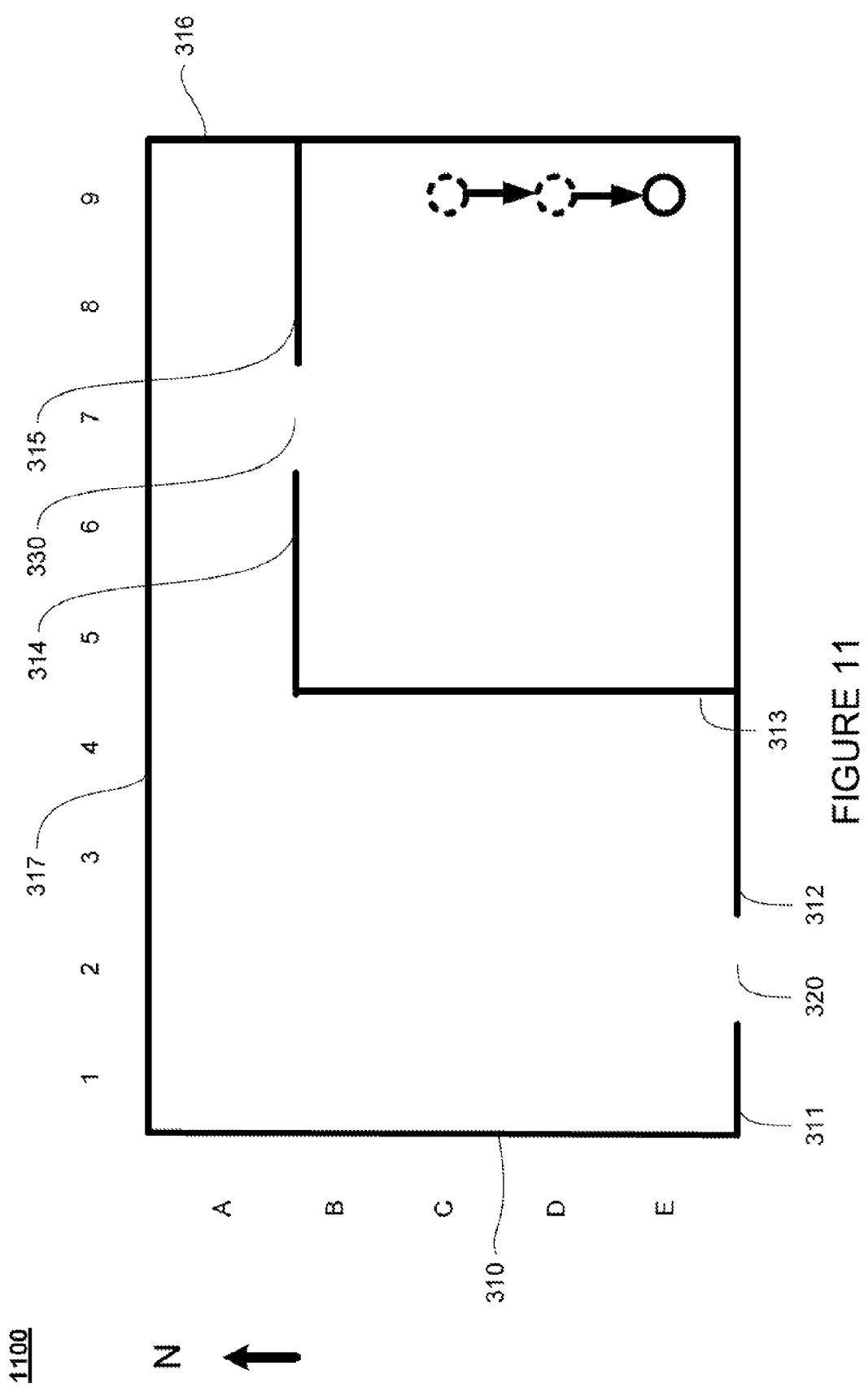
FIG. 11 is yet another map of the indoor space in accordance with an exemplary embodiment.

The distance traveled by the client device may vary based on the speed of the user. This distance traveled, or rather the speed of the client device, may be determined by using the orientation device as a pedometer as described above. For example, as shown in FIG. 11, the user has now moved 2 meters south in 1 second, whereas in the previous examples, the user may only have moved 1 meter in 1 second. Again, after applying the movements to the remaining particles, any particles that would have run into walls may be removed as their likelihood values will have been reduced below the threshold value.

If the particles are removed based on the likelihood value as described above, once the number of particles has reached some minimum number, for example if only a single particle remains, the location of the remaining particle may be determined to be an actual location of the client device. For example, as shown in FIG. 11, after the particles are moved 2 meters south, only a single particle remains at location E9, as the particles previously located (see FIG. 10) at D9 and E9 have run into wall 312 and have been removed. Thus, the remaining particle's location, E9, may be determined to be an actual location of the client device.

This actual location of the client device may be a current location of the client device if the processing is done in real time at the client device. It may also be a prior location of the client device, for example, if the information is transmitted to a server and the processing performed at a later time.

Figure 12:
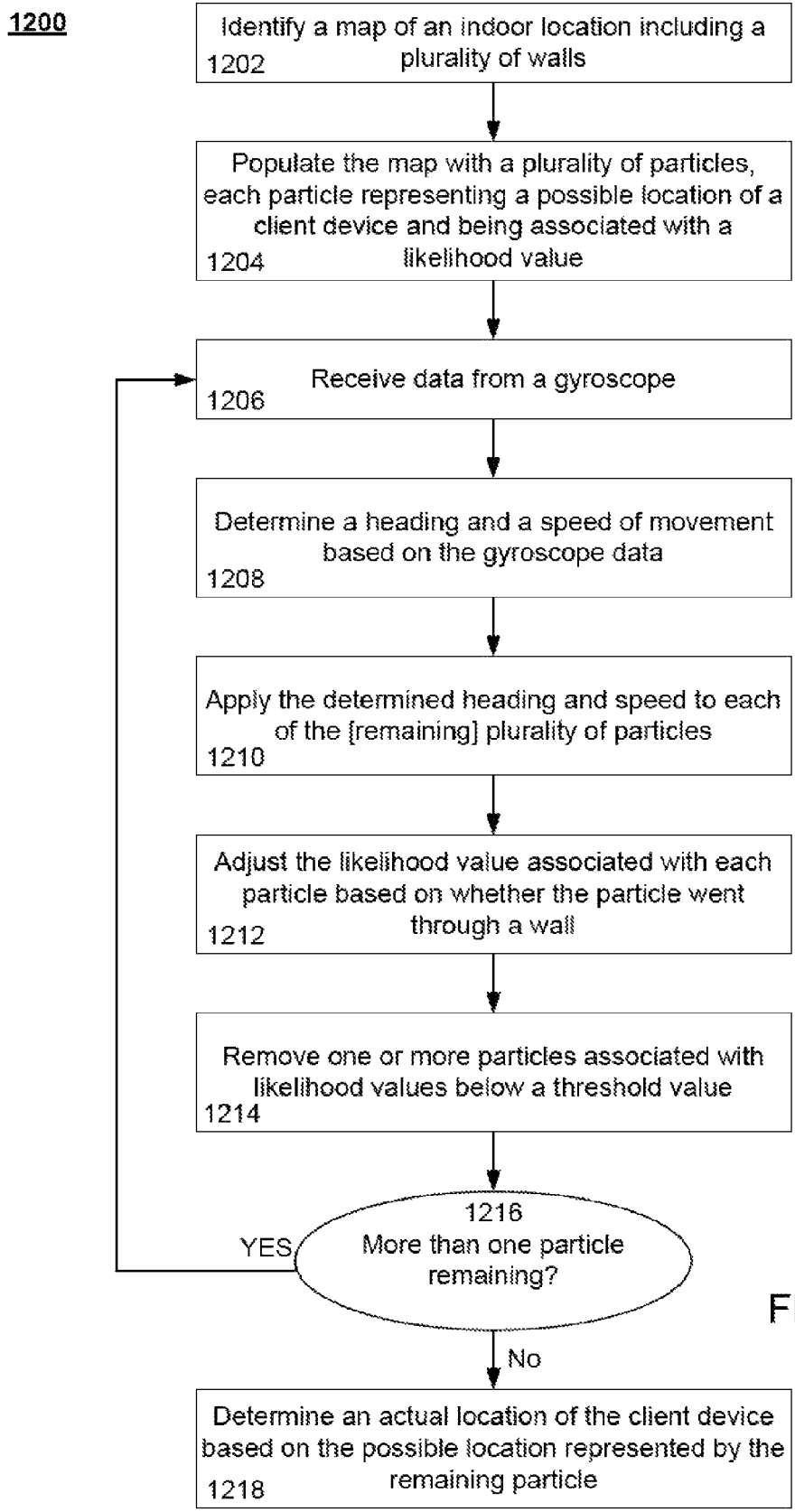
FIG. 12 is a flow diagram in accordance with exemplary embodiment.

Exemplary flow diagram 1200 of FIG. 12 depicts aspects of the processes described above. For example, at block 1202, a map of an indoor location including a plurality of walls is identified. At block 1204, the map is populated with a plurality of particles. Each particle represents a possible location of the client device with respect to the map. Each particle is also associated with a likelihood value indicative of how likely the client device is located at the representative location. Data is received from a gyroscope (or other orientation device) at block 1206. The data is used to determine a direction of movement and a speed of movement at block 1208. The determined heading and speed are applied to each of the plurality of particles at block 1210. The likelihood value associated with each particular particle is then adjusted based on whether the particular particle would contact or move through a wall as a result of applying the determined heading and speed are removed at block 1212. One or more particles are then removed if the associated likelihood value falls below a threshold value at block 1214. If after the particles are removed, more than one particle of the plurality of particles is remaining at block 1216, the process returns to block 1206 where new accelerometer data is received. Again, this data is used to determine a new heading and speed of movement at block 1208. This new direction of movement and speed is then applied to each of the remaining plurality of particles at block 1210. The likelihood value associate with each particle is adjusted based on whether the particle would contact or move through a wall at block 1212. Again, particles associated with a likelihood value below the threshold value are removed at block 1214.

Returning to block 1216, if after removing the particles that have contacted a wall only one particle of the plurality of particles remains, then the remaining particle is used to determine the current location of the client device at block 1218. For example, the possible location represented by the remaining particle may be determined to be an actual location of the client device. As noted above, the aforementioned operations do not have to be performed in the precise order described above; rather, the various steps may be handled in a different order or simultaneously. Steps may also be omitted unless otherwise stated.

In another example, described in more detail below, once all of the remaining particles of the walls example are within a threshold radius of one another, the mean location of the remaining particles may be determined. The particle representing a location closest to the mean location of the remaining particles may be identified as the location of the client device.

In an alternative, rather than removing the particles which are below some threshold, the number of particles may remain the same. In this example, which is more complicated but also more robust than the model describe above, particles may be rewarded or penalized by adjusting the likelihood value but not removed based on any threshold value. For example, if a particle has not passed through a wall the particle may receive a higher reward (or a lower penalty) than if it had. It will be understood that various valuation systems may be used to affect a similar result. For example, a similar system may also be used where particle values are increased when a particle runs into a wall.

Every so often the particles may be resampled with replacement. For example, each time a new step has been taken or a period of time has passed, the particles may be redistributed. The resampled set of particles is selected based on the values associated with the first set of particles. For example, returning to FIG. 5, after taking one step to the East, the particles at locations B5 through E5 may be penalized for passing through wall 313. Similarly, the particles at locations B4 through E4 may be rewarded for passing through wall 313. Thus, the particles now located at location B4 may be associated with a greater likelihood value than the particle now located at B5. When the particles are resampled (or redistributed), the particle at location B4 may be more likely to be selected for the next generation than the particle at B5.

Particles are selected based on these values until the child generation includes the same number of particles as the parent generation. For example, in FIG. 4, there are 45 particles. After a step has been taken, 45 particles will be selected. Particles with higher likelihood values are more likely to be selected, and may be selected multiple times. For example, if there may be 5 total particles S, T, U, V, and W, where S=(Xs, Ys), T=(Xt, Yt), U=(Xu, Yu), V=(Xv, Yv), and W=(Xw, Yw). Each of these particles may be associated with likelihood values of 5, 10, 5, 1, and 1, respectively. S is likely to be selected 5/17 of the times, while T is likely to be selected 10/17 times, etc. So, for example, particle T may be selected three times while particles S and U may be selected twice. In another example, particle T may be selected twice while particles S and U are selected once, and particle W is selected once.

Each particle selected during the resampling is then given some small degree of change. For example, if the particle located at T=(Xt, Yt) is selected twice, two new "child" particles may be generated with some slight adjustment to the location (x and y values) of the selected particle. In this example, the results may be T1=(Xt1, Yt1) and T2=(Xt2, Yt2), where Xt1 and Xt2 represent some slight change from Xt and Yt1 and Yt2 represent some slight change from Yt. By adding this slight noise to each new "child" particle, the system automatically adjusts for slight errors in the orientation device calculations, etc.

The next generation of particles may again be associated with likelihood values which are adjusted based on the movements detected by the orientation device. After some period of time or some number of steps, the particles may be resampled and a new generation of particles may be generated as described above.

Here, rather than waiting until the number of particles dwindles to some small number to identify the current location of the client device, the particles may continue to be resampled until all of the particles (in a given generation) are within some small, empirically derived distance from one another. For example, after subsequent resampling and adjustment to the locations associated with each of the particles, eventually all of the particles may be within some small, for example a few meters or less, radius of one another.

This grouping may be referred to as "clustering." For example, returning to the example of FIG. 5, after moving one step to the East, the particles which would have moved through walls 313 or 316 and off of map 500 are less likely to be selected during the sampling. Thus, the particles of the new generation are likely to be selected from those particles show in solid line. Eventually, the combination of the movement of the client device and the resampling of the particles may result in clustering of the locations of the particles. Turning to FIG. 8, the particles are eventually arranged into two major clusters 870 and 875. Although only 18 particles are shown in solid line, it will be appreciated that in this particular example, the 18 particles represent the areas associated with 45 particles.

Figure 10:
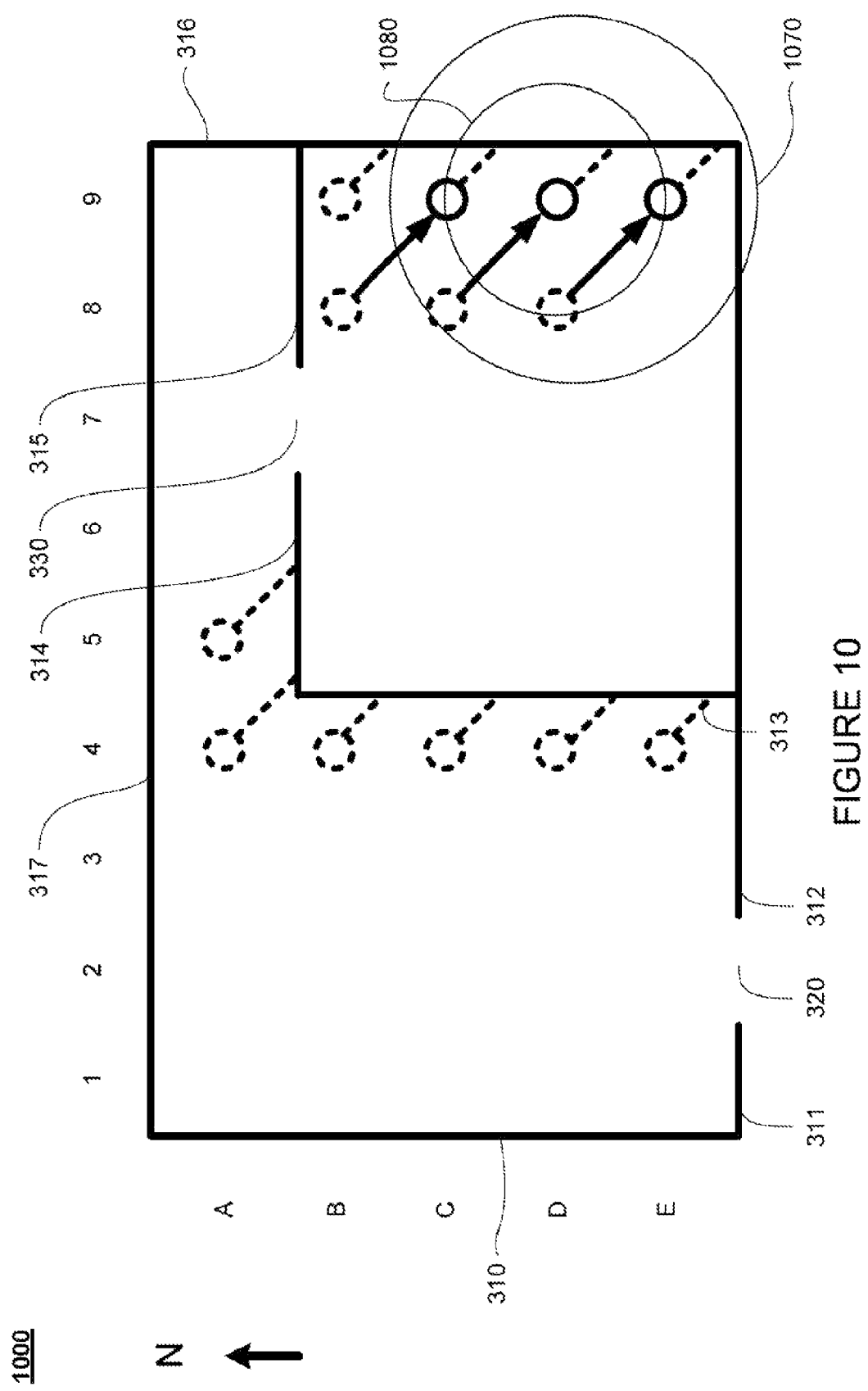
FIG. 10 is another map of the indoor space in accordance with an exemplary embodiment.

As it becomes less likely that the particles in cluster 870 are selected during the resampling, only the locations within cluster 1070 of FIG. 10 may remain. As shown in FIG. 10, all of the particles are located within cluster 910. Thus here, all of the particles are located within a 2 meter radius. Again, although only 3 are shown in solid line, it will be appreciated that in this particular example, the 3 particles represent the area associated with 45 particles.

Once the particles are within a threshold radius, the actual location of the client device may be determined. For example, the average representative location of the particles may be determined. The particle closest to this mean location may be selected as the particle representing the current location of the client device.

Using the simplistic example of FIG. 10, 3 particles representing locations C9, D9, and E9 are shown (assuming, in this example, that the three particles represent the locations of all of the particles). These particles are within a threshold radius 1080 of 2 meters. The mean location of the particles is the center 1090 of radius 1080 (this is because the particles are evenly distributed along a line). The particle representing location D9 may be selected as representing the current location of the client device as it is located closest to this point.

Figure 21:
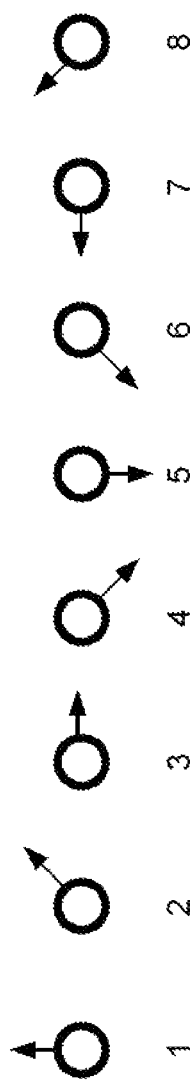
FIG. 21 is particles in accordance with an exemplary embodiment.

For the purpose of simplicity, the examples above use particles representing only spatial coordinates. However, particles may not only represent possible locations of the client device, but also possible headings. In this case, the initial set of particles may reflect not only a variety of starting positions, but a variety of initial headings as well. Headings may also be used to adjust the likelihood value as discussed above. For example, as shown in FIG. 21A, a set of particles may initially represent one or more map locations. The 8 particles may represent a single or multiple locations each with a slightly different heading. If the client device's compass is used to determine that the client device is moving east, particles associated with a heading other than east may be penalized by adjusting the likelihood value of particles downwards while particles with the heading East may be rewarded by adjusting their associated likelihood value upwards. Thus, particle 3 may be rewarded and particles 1-2 and 4-8 may be penalized and their associated likelihood values adjusted accordingly. As described above, if the likelihood value is below some threshold, the particles may be removed.

Alternatively, if the particles are resampled, particles with the correct heading may have a higher likelihood value and may be more likely to be selected for the next generation. Again, any child particles generated may include a slight heading change from the parent. Returning to the example, above, particle T may also include a heading Ht, such that T=(Xt, Yt, Ht). A child particle generated from T may be T1'=(Xt1, Yt1, Ht1), where Xt1 represent some slight change from Xt, Yt1 represents some slight change from Yt, and Ht1 represents some slight change from Ht. Once the particles have become so clustered that they all fall within a threshold radius as described above, the selected particle identified as the actual location of the client device may also be used to identify a current heading of the heading device.

Other signals, such as wireless network access point signals or cellular tower triangulation positioning, may also be used to adjust the likelihood value of particles. For example, a map of an indoor location may include the location and signal strengths of one or more wireless network access points. These access points may transmit beacon messages including data such as a Media Access Control ("MAC") address identifying the access point. These beacon messages may be received and recorded by the client device in order to adjust likelihood values. It will be understood that any wireless network data received by the client device may be limited to the identification information and signal strengths and need not contain additional information. For example, information contained in the network traffic, such as personal information, need not be collected, and in fact, may actually be removed in order to protect the privacy of the wireless network's users.

For example, the client device is in a location which receives a beacon message from a wireless network access point according to the map. Particles representing locations not be within range of the wireless network access point according to the map may be penalized. Similarly, particles which are within the range of the wireless network access point according to the map may be rewarded. Again, particles associated with a higher likelihood value are less likely to be removed or alternatively, more likely to be resampled.

RAILS EXAMPLE

Figure 13:
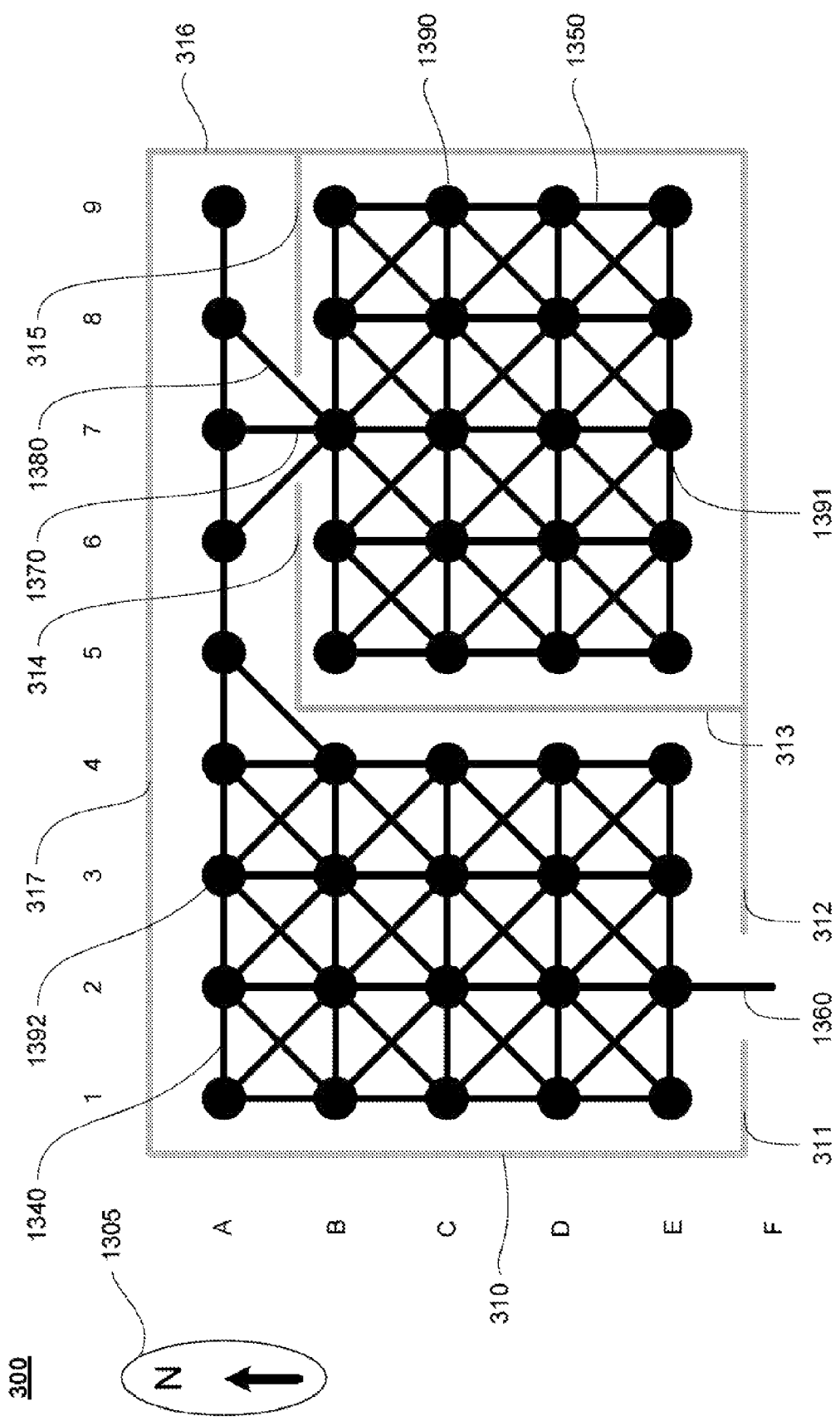
FIG. 13 is a map of the indoor space in accordance with an exemplary embodiment.
Figure 14:
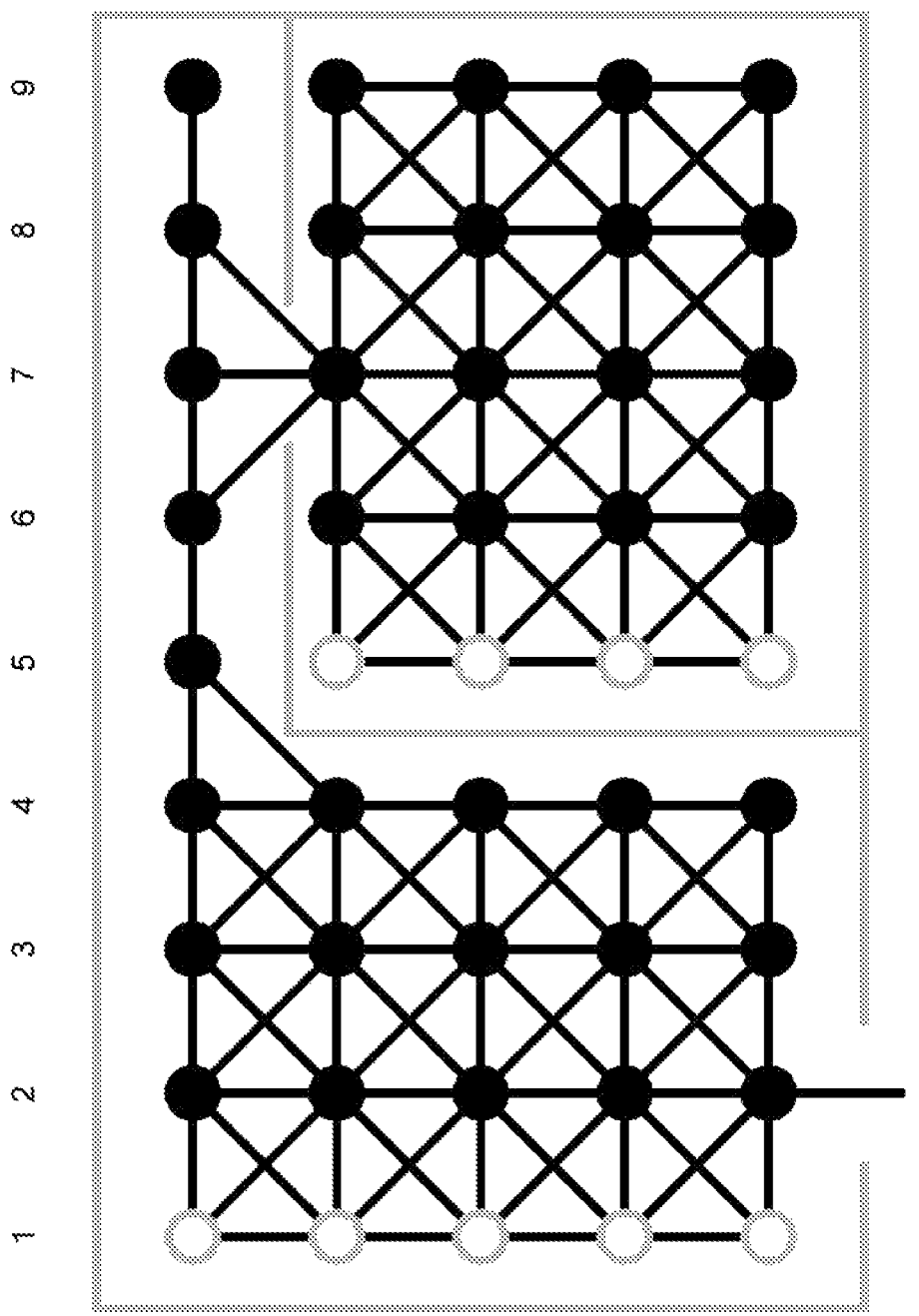
FIG. 14 is another map of the indoor space in accordance with an exemplary embodiment.

In another example, a client device may also be located within a building and unable to obtain a GPS fix. In response, the client device may access a map of the indoor space. As shown in FIG. 13, map 1300 may include a coordinate system, A-F and 0-9, where the distance between coordinates of the same axis represents 1 meter. Rather than being defined by walls as in map 300, map 1300 may include a plurality of rails, such as rails 1340, 1350, 1360, and 1370, representing paths along which a user may walk within the building. Each rail may be associated with an identifier. Here, the rails may be identified based on the coordinates associated with the end points. Thus, rail 1340 may be identified as rail A1-A2 or A2-A1, rail 1350 may be identified as rail D9-E9 or E9-D9, rail 1360 may be identified as rail E2-F2 or F2-E2, etc.

The features of map 1300, though visually different from maps 300-1100, define the same indoor space as maps 300-1100. The grayed lines 1310-1317 represent walls 310-317 which are no longer included in map 1300. For example, rails 1370 and 1380 may represent paths through doorway 330 and rail 1360 may represent a path through entrance/exit 320. The map may also include a map pointer 1305 which indicates the orientation of the indoor space.

The client device may populate the map with particles. Each particle may represent a possible location of the client device. Map 1300 also includes a plurality of particles, represented by the black circles, such as particle circles 1390-1392, on the rails. Although the particles are depicted as evenly distributed, it will be understood that various arrangements may be used, for example, particles may be assigned locations randomly or clumped together along the rails in locations where an individual is most likely to be located.

Each of the particles may represent a map coordinate along a respective rail at which the client device could be located. As noted above, each particle may also be associated with heading, wireless network and other signal information. However, for simplicity, these additional signals are not used in the present example, though it will be understood that these signals may be used. Each of the particles may also be identified by its respective coordinates; particle circle 1390 as C9, particle circle 1391 as E7, and particle circle 1392 at A3.

As the client device is moved around an indoor space, the client device's movements may be tracked by way of the client device's orientation device as described above. FIGS. 14-18 depict the same movement through the indoor space as FIGS. 3 and 5-11.

After determining the client device's movements (current heading and speed) based on the information from the orientation device, the effect of the movements on each of the particles may be determined. Again, in one example, shown in FIGS. 14-18, each time a particle violates some constraint (moves off of a rail) associated with the map, the value associated with the particle may be adjusted such that the value is below some threshold, and as a result, the particle is removed. For example, as shown in map 1400 of FIG. 14, if the user moves east 1 meter, each particle may be "moved" east 1 meter along the rails. Thus, the particle representing A1 may be moved along rail A1-A2 to location A2, the particle representing A2 may be moved along rail A2-A3 to location A3, etc. As no particle moving 1 meter to the east would be moved into location A1 (shown in white), this location is no longer represented by a particle (or black circle). Similarly, the particles at B1, C1, D1, and E1 are also shown in white as these locations are no longer represented by particles.

After each particle is "moved" based on the direction and speed of movement of the client device, the likelihood values may be adjusted based on whether the particle has run into a wall. For example, if a particle at location B4 is moved 1 meter to the east, the particle would run into wall 313. At location B4, there is no rail extending east for 1 meter. Thus, if particle B4 were to move 1 meter to the east, it would move off of the rails. The particle's likelihood value may be adjusted, for example, reduced.

Each particle's likelihood value may then be compared to a threshold value. In one example, if any particular particle's likelihood value falls below the threshold value, the particle may be removed. Similar to the example above where particles which contacted walls were removed, particles which move off of the rails may also be removed as their likelihood values will have been reduced below the threshold value. Accordingly, particle B4's likelihood value may be below the threshold value and it may be removed. Thus, this particle does not move into location B5, and B5 location is no longer represented by a particle but rather in white. Similarly, the particles originally at locations C4, D4, and 4E would go off of the rails if moved 1 meter to the east. Thus, locations C5, D5, and E5 are also shown in white as these locations are no longer represented by particles.

Again, as the client device moves within the building, the client device may continue to determine the heading and speed of its movements. As shown in map 1500 of FIG. 15, if the client device changes direction and moves 1 meter south, each of the particles may be "moved" to reflect this movement of the client device. Again, the remaining particles (from FIG. 14) that would move off of the rails may be removed as their likelihood values will have been reduced below the threshold value. Accordingly, in FIG. 15, locations A2, A3, A4, A5, A6, A7, A8, A9, B6, B8, and B9 are now shown in white.

If a particle at location E2 is moved 1 meter south along rail E2-F2, the particle will have moved through entrance/exit 320. If this particle were to represent the actually current location of the client device, the client device would have moved through entrance/exit 320. Accordingly, the client device would then be outside of the building. Once outside, the client device would be able to receive GPS signals. The GPS signals may be used to identify a current location of the client device. Accordingly, the client device may determine that it is no longer within the building and continue to determine its current location based on the GPS signals.

Figure 16:
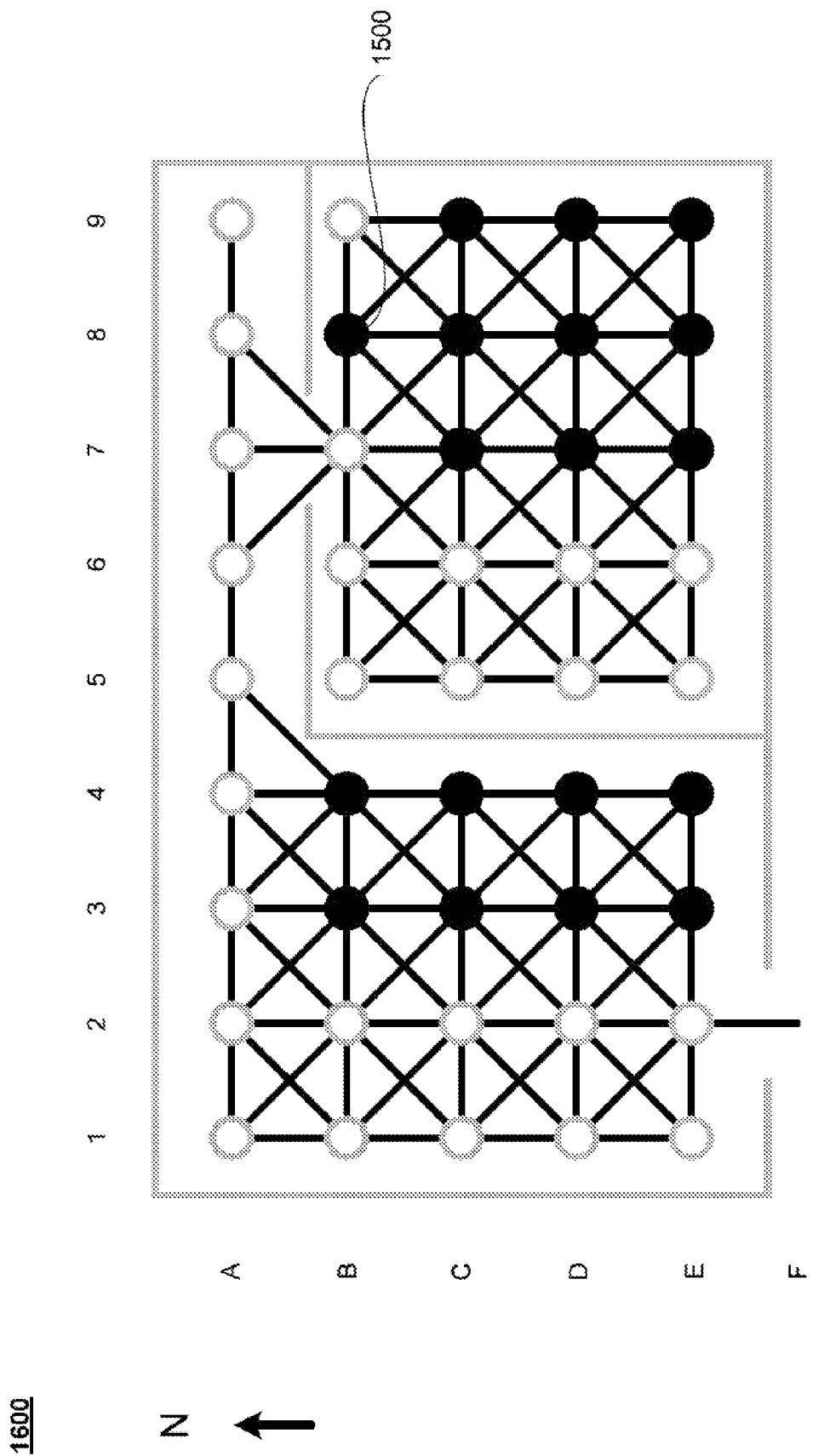
FIG. 16 is still another map of the indoor space in accordance with an exemplary embodiment.
Figure 17:
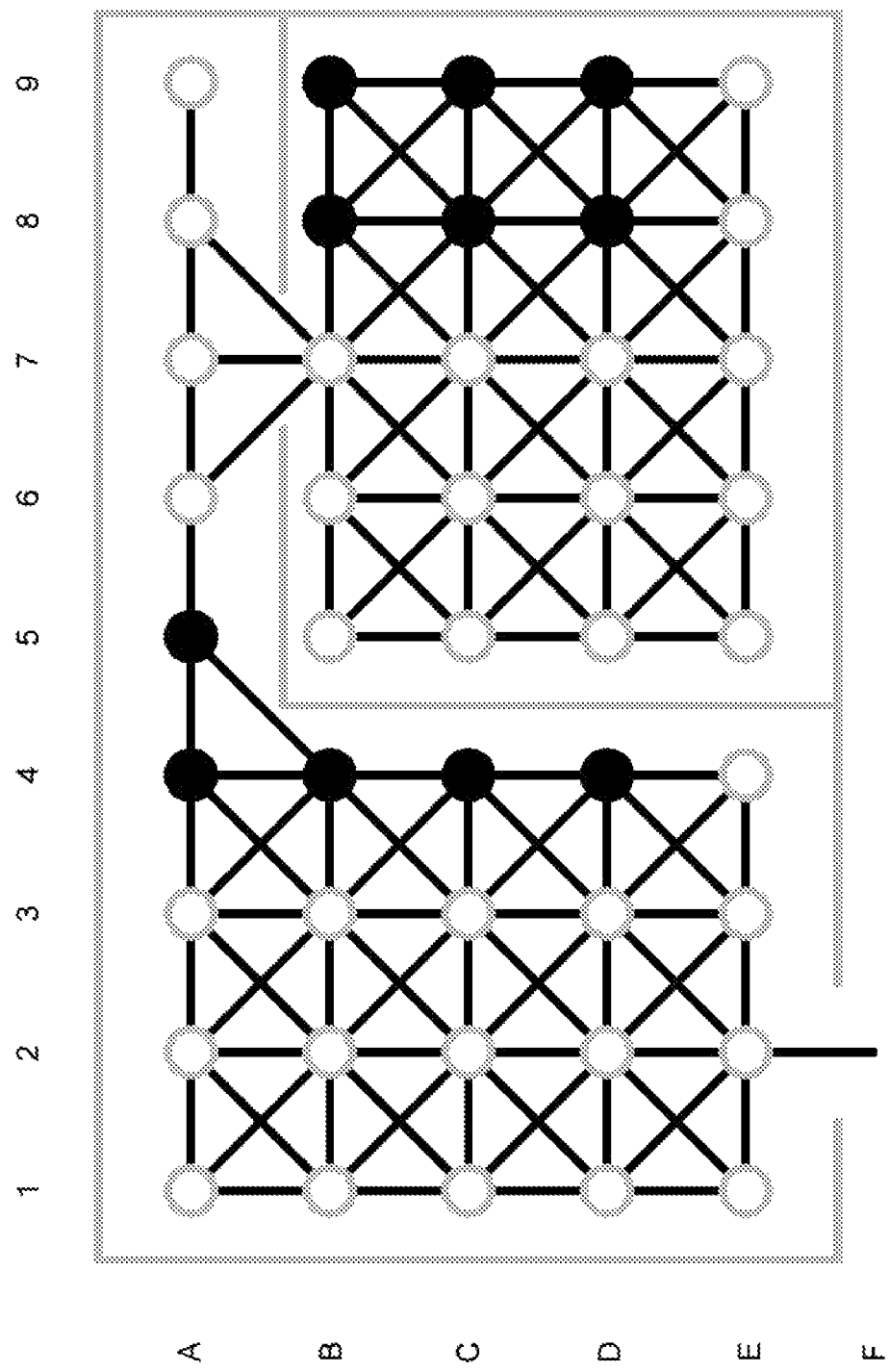
FIG. 17 is a further map of the indoor space in accordance with an exemplary embodiment.
Figure 18:
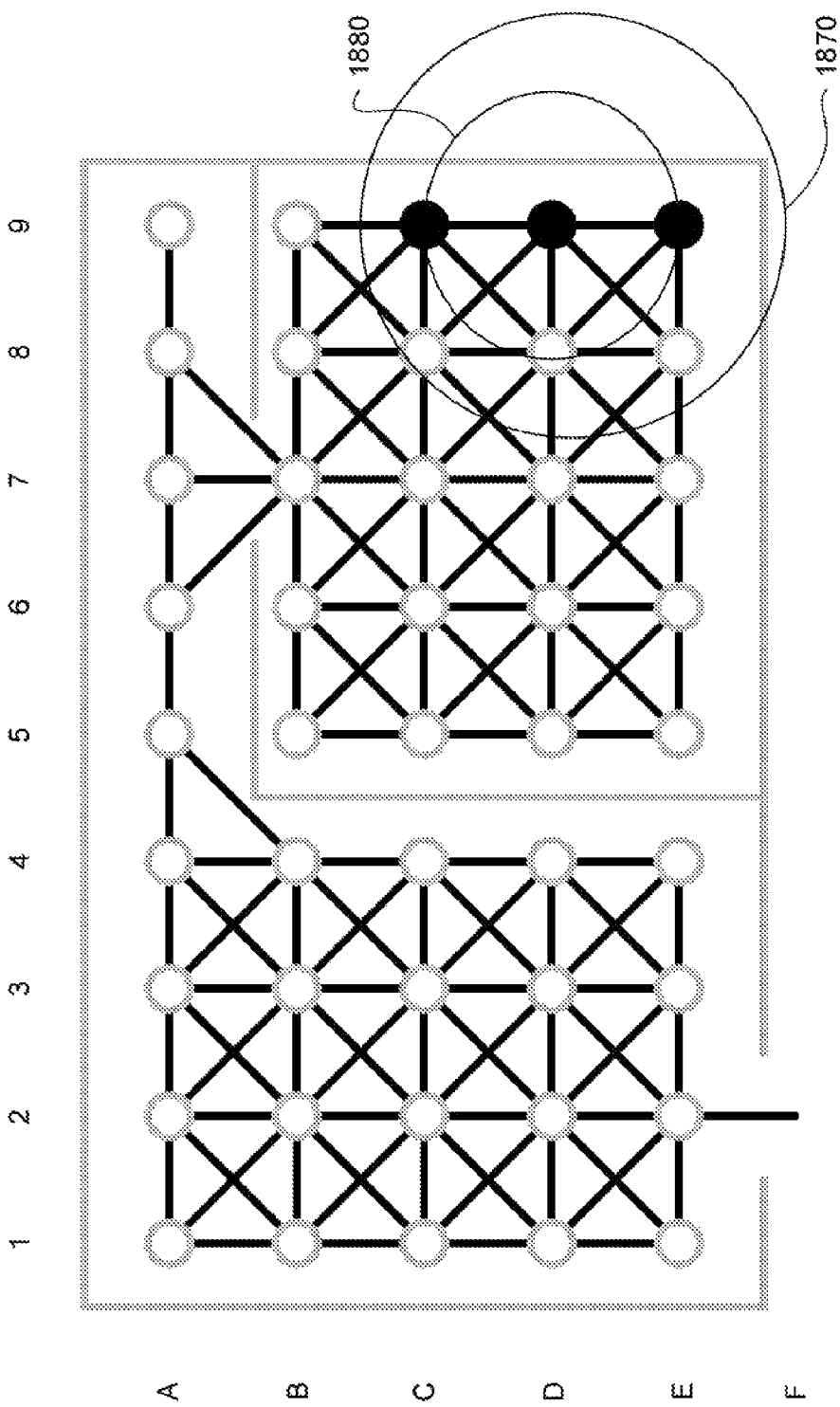
FIG. 18 is yet a further map of the indoor space in accordance with an exemplary embodiment.
Figure 19:
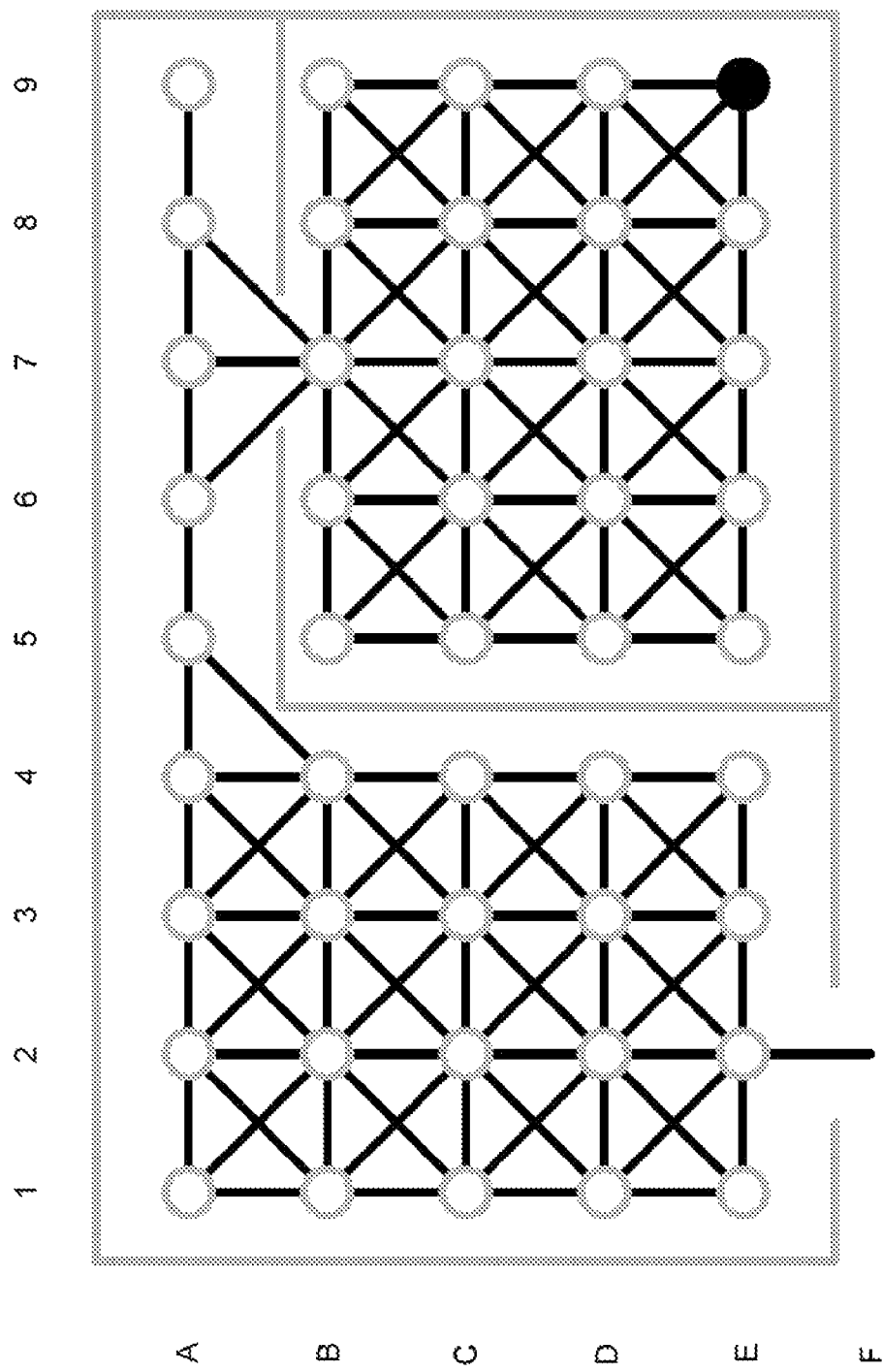
FIG. 19 is still a further map of the indoor space in accordance with an exemplary embodiment.

If the user has not left the building and the user continues to move within the building, particles may continue to be "moved" and removed based upon the movements of the client device. Thus, as shown in FIG. 16, moving another meter to the east will result in the elimination of additional particles as their likelihood values will have been reduced below the threshold value. Returning to FIG. 15, after moving 1 meter south, there is no longer a particle representing location B8. However, once the user moves 1 meter to the east, as shown in map 1600 of FIG. 16, particle 1510 now represents this location. As shown in maps 1700 and 1800 of FIGS. 17 and 18, if the client device moves approximately 1.4 meters to the northeast and subsequently approximately 1.4 meters southeast, many of the remaining particles will go off of the rails and only 2 particles will remain; those representing locations C9 and D9. Finally, if the client device is moved 2 meters south, the particle at location D9 in FIG. 18 will have moved off of the rails, and as shown in FIG. 19, only the particle representing location E9 will remain.

Again, once the number of particles has reached some minimum number, for example only a single particle remains, the location of the remaining particle may be determined to be the location of the client device. Returning to FIG. 19, only a single particle remains at location E9. This location may then be determined to be the location of the client device.

Exemplary flow diagram 2000 of FIG. 20 depicts aspects of the processes described above. For example, at block 2002, a map of an indoor location including a plurality of rails is identified. The rails define possible paths within the indoor location. At block 2004, the map is populated with a plurality of particles. Each particle represents a possible location of the client device with respect to the map. Each particle is also associated with a likelihood value indicative of how likely the client device is at the representative location. Data is received from an accelerometer (or other orientation device) at block 2006. The data is used to determine a direction of movement and a speed of movement at block 2008. The determined heading and speed are applied to each of the plurality of particles at block 2010. The likelihood value associated with each particular particle is then adjusted based on whether the particular particle would move off of a rail as a result of applying the determined heading and speed are removed at block 2012. One or more particles are then removed if their associated likelihood value falls below a threshold value at block 2014.

If after the particles are removed, more than one particle of the plurality of particles is remaining at block 2014, the process returns to block 2006 where new accelerometer data is received. Again, this data is used to determine a new heading and speed of movement at block 2008. This new direction of movement and speed is then applied to each of the remaining plurality of particles at block 2010. The likelihood value associate with each particle is adjusted based on whether the particle would move off of a rail at block 1212. Again, particles associated with threshold values below the threshold value are removed at block 2014.

Returning to block 2016, if after removing the particles that have moved off of the rails, only one particle of the plurality of particles remains, this remaining particle is used to determine an actual location of the client device at block 2016. For example, the possible location represented by the remaining particle may be determined to be an actual location of the client device. As noted above, the aforementioned operations do not have to be performed in the precise order described above; rather, the various steps may be handled in a different order or simultaneously. Steps may also be omitted unless otherwise stated.

In another example, as described above, once all of the remaining particles of the rails example are within a threshold radius of one another, the mean location of the remaining particles may be determined. The particle representing a location closest to the mean location of the remaining particles may be identified as the location of the client device.

Similar to the alternative described above with respect to the walls map, rather than removing the particles associated with likelihood values which are below some threshold, the number of particles may remain the same. Particles may be rewarded or penalized by adjusting the likelihood value each time the client device detects that it is moving. For example, if a particle has not moved off of a rail the particle may receive a higher reward (or a lower penalty) than if it had. Again, it will be understood that various valuation systems may be used to affect a similar result. For example, a similar system may also be used where particle values are increased when a particle moves off of a rail.

Every so often the particles may be resampled with replacement. For example, each time a new step has been taken or a period of time has passed, the particles may be redistributed. The resampled set of particles is selected based on the values associated with the first set of particles. Again, particles with higher likelihood values may be selected more often the particles with lower likelihood values.

For each particle which is selected during the resampling, a new particle may be generated with a slight adjustment to the location (and heading if applicable). For example, turning to FIG. 14, the particle at location B6 may be selected during the resampling. The child particle produced from the particle at location B6 may represent a location along rail A3-B3, B3-C3, A2-B3, B3-C4, A4-B3, or C2-B3. Again, the new particle may also be associated with a slight heading change.

This next generation of particles may again be associated with likelihood values which are adjusted based on the movements detected by the orientation device. After some period of time or some number of steps, the particles may be resampled and a new generation of particles may be generated as described above.

Once all of the particles (in a given generation) are within some small, empirically derived distance from one another the actual location of the client device may be determined. For example, after subsequent resampling and adjustment to the locations associated with each of the particles, eventually all of the particles may be within some small radius of one another, for example a few meters or less. Turning to FIG. 18, all of the particles are located within cluster 1870. Thus, all of the particles are located within a 2 meter radius. Again, although only 3 are shown in solid circles, it will be appreciated that in this particular example, the 3 particles represent the area associated with 45 particles. The mean location of the particles within the threshold radius may then be determined. As in the example above, the particle closest to this mean location may be selected as the particle representing the current location of the client device.

Again using the simplistic example of FIG. 18, 3 particles representing locations C9, D9, and E9 are shown (assuming, in this example, that the three particles represent the locations of all of the particles). These particles are within a threshold radius 1880 of 2 meters. The mean location of the particles is the center of threshold radius 1880 (again, this is because the 3 particles are evenly distributed along a line). The particle representing location D9 may be selected as representing the current location of the client device as it is located closest to this point. This selected particle identified as the actual location of the client device may also be used to identify a current heading of the heading device as explained above.

Figure 22A:
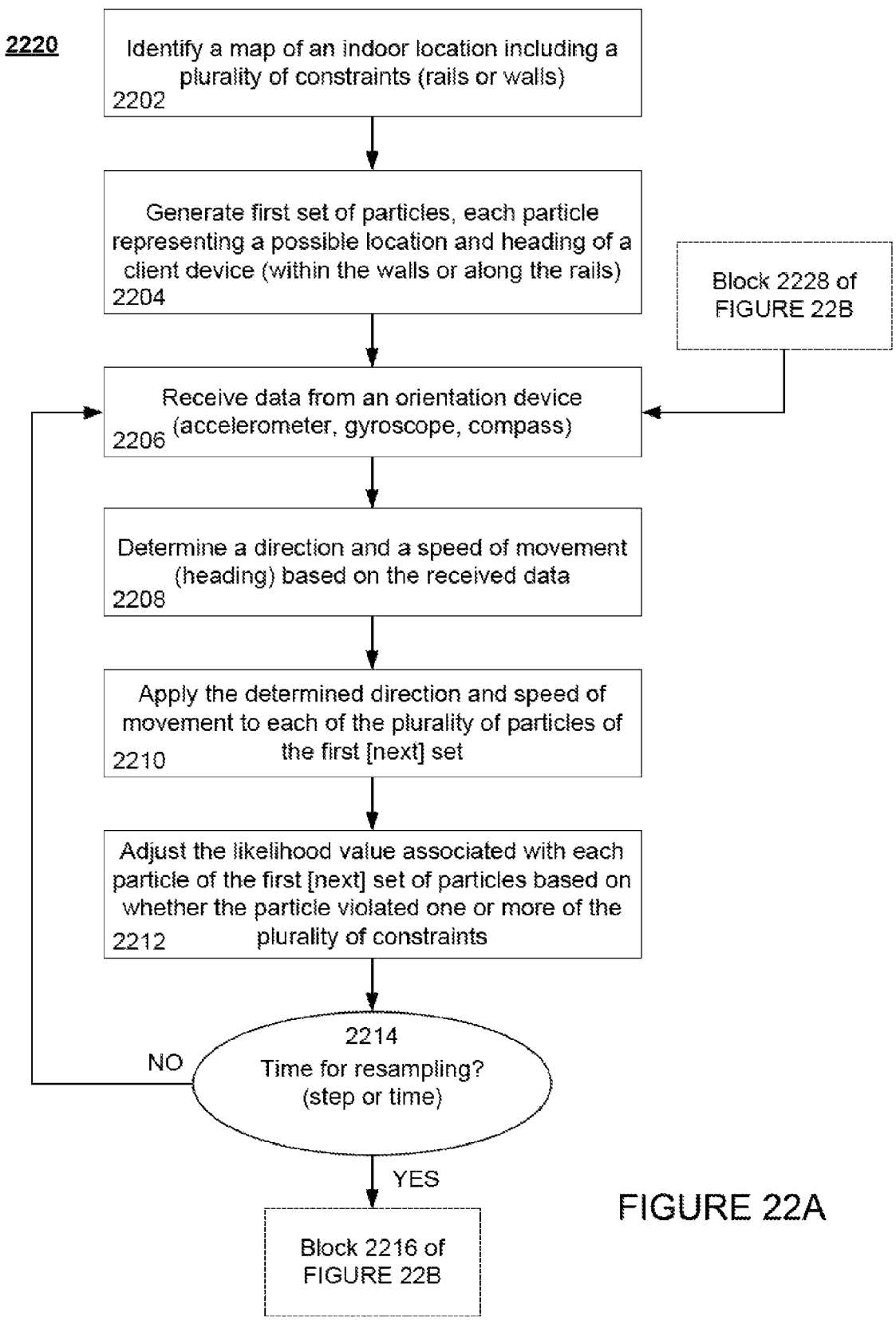
FIGS. 22A and 22B are a flow diagram in accordance with an exemplary embodiment.
Figure 22B:
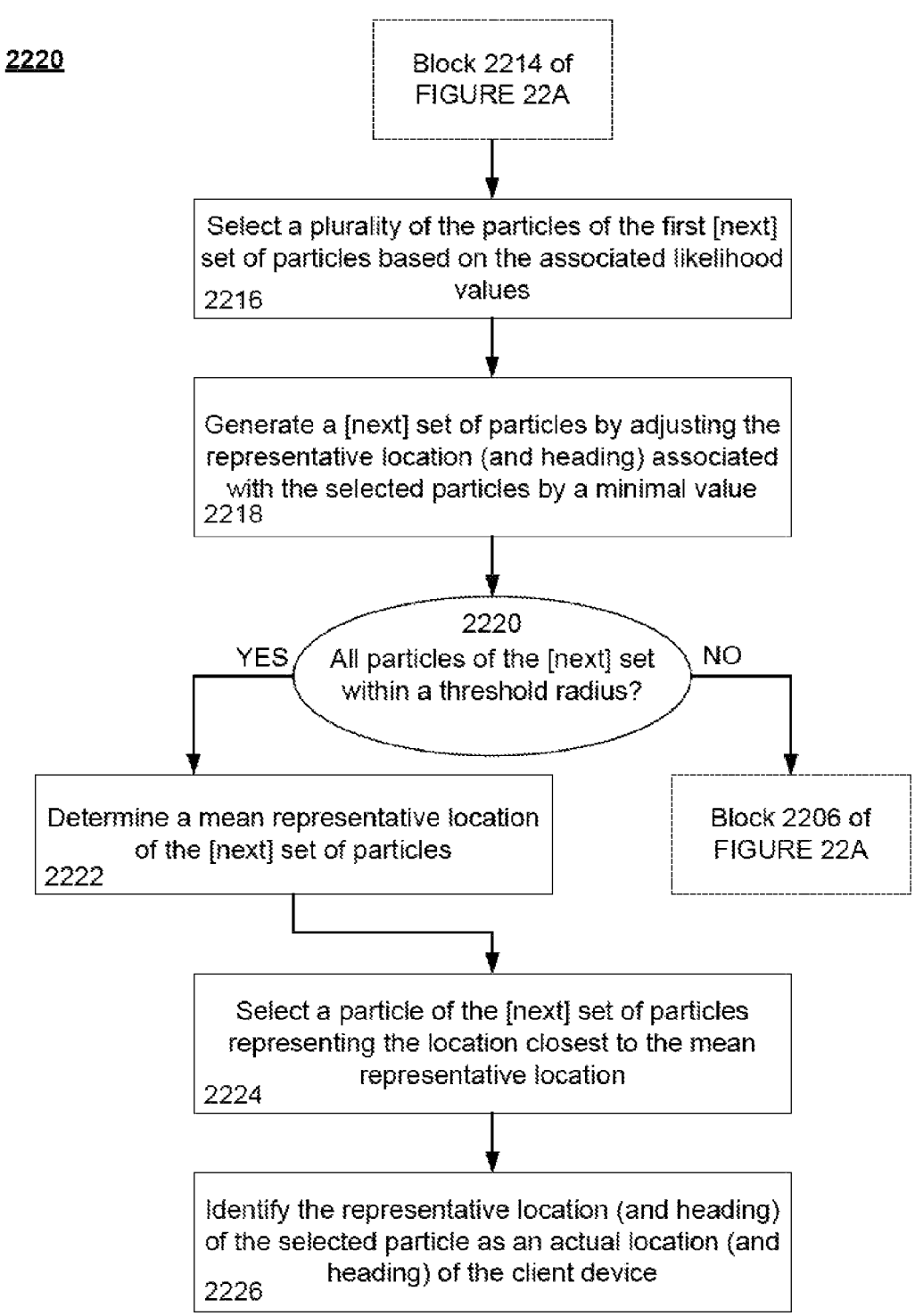

Exemplary flow diagram 2200 of FIGS. 22A and 22B depicts aspects of the processes described above. For example, at block 2202, a map of an indoor location including a plurality of constraints. As described above the constraints may include walls or rails. At block 2204, the map is populated with a plurality of particles. Each particle represents a possible location of the client device with respect to the map. In some examples, the particles may also represent a possible heading of the client device. Each particle is also associated with a likelihood value indicative of how likely the client device is at the representative location.

Data is received from a gyroscope (or other orientation device) at block 2206. The data is used to determine a direction of movement (a heading) and a speed of movement at block 2208. The determined direction and speed are applied to each of the plurality of particles at block 2210. The likelihood value associated with each particular particle is then adjusted based on whether the particular particle would violate a constraint of the map, for example by contacting or moving through a wall or moving off of a rail, at block 2212. In some examples, the likelihood values may be adjusted based on whether the particles' headings are consistent with the determined heading. Again, as noted above, other signals may also be used to adjust the likelihood values.

At block 2214, it is determined whether it is time to resample. For example, the server or client device may determine whether or not a step has been taken or whether some period of time has passed. If not, the process returns to block 2206 and additional data is received from the orientation device, etc. If it is time to resample, the process continues at block 2216 of FIG. 22B where a plurality of particles of the first set of particles is selected based on the associated likelihood values. A next set of particles is then generated by adjusting the representative location (and in some examples, heading) of the selected particles by some minimal value at block 2218.

At block 2220, it is determined whether all of the particles of the next set of particles are within some threshold distance from one another or threshold radius. If not, the process returns again to block 2206 of FIG. 22A and additional data is received from the orientation device, etc. If all of the particles of the next set are within a threshold radius, a mean representative location of the particles of the next set of particles is determined at block 2222. The particle representing the location closest to the mean representative location is then selected at block 2224. The representative location of the selected particle is then identified as an actual location (and, in some examples, heading) of the client device at 2226.

As these and other variations and combinations of the features discussed above can be utilized without departing from the subject matter defined by the claims, the foregoing description of the embodiments should be taken by way of illustration rather than by way of limitation of the subject matter defined by the claims. It will also be understood that the provision of the examples disclosed herein (as well as clauses phrased as "such as," "including" and the like) should not be interpreted as limiting the claimed subject matter to the specific examples; rather, the examples are intended to illustrate only one of many possible embodiments. Further, the same reference numbers in different drawings may identify the same or similar elements.

The invention claimed is:

1. A method of determining a location of a portable handheld device in an indoor space:
   identifying a map of an indoor space, the map being based on a plurality of constraints;
   generating, by a processor, a first set of particles, each particle of the first set of particles representing a location on the map and being associated with a likelihood value;
   receiving data from an orientation device including a gyroscope; determining a direction and speed of movement based on the received data;
   applying the direction and speed of movement to each one of the first set of particles;
   adjusting, by the processor the likelihood value of each particular particle of the first set of particles, based on whether the particular particle violated one or more of the plurality of constraints;
   generating a second set of particles based on the likelihood values associated with the first set of particles;
   selecting, by the processor a particular particle of the second set of particles closest to an average representative location of the second set of particles when all of the particles of the second set of particles are within a threshold radius of one another; and
   identifying, by the processor an actual location of the portable handheld device in the indoor space based on a representative location of the selected particle.

2. The method of claim 1, wherein the plurality of constraints are walls which define areas where a user may not walk.

3. The method of claim 1, wherein the plurality of constraints are rails which define areas where a user is permitted to walk.

4. The method of claim 1, wherein the map is associated with a direction indicator, and wherein applying the direction and speed of movement to each of the particles of the plurality of particles is based on the direction indicator.

5. The method of claim 1, wherein each particle of the first set of particles further represents a device heading, and the method further comprises:
   identifying a heading based on the received data; and
   wherein adjusting the likelihood value of each particular particle of the first set of particles is further based whether the heading associated with each particular particle is associated with a heading consistent with the identified heading.

6. The method of claim 1, further comprising identifying the representative heading of the selected particular particle as an actual heading of the client device.

7. The method of claim 1, wherein the orientation device further includes a compass.

8. The method of claim 1, wherein the orientation device further includes an accelerometer.

9. The method of claim 1, wherein determining the direction and speed of movement is based on the received data is further based on using the accelerometer as a pedometer.

10. The method of claim 1, wherein the first set of particles and the second set of particles each includes the same number of particles.

11. The method of claim 1, wherein the second set of articles is generated by:
    selecting particles of the first set of particles based on the likelihood values associated with the first set of particles; and
    adjusting the representative locations of the selected particles by a minimal value.

12. The method of claim 11, wherein each particle of the first set of particles further represents a device heading, and the method further comprises:
    identifying a heading based on the received data; and
    adjusting the likelihood value of each one of the first set of particles based on whether the heading associated with each particle is associated with a heading consistent with the identified heading and wherein the second set of particles is generated by adjusting each of the representative headings of the selected particles of the first set of particles by a minimal heading value.

13. The method of claim 1, wherein the second set of particles is generated by removing particles from the first set of particles based on whether the likelihood values associated with the first set of particles meet a minimum likelihood threshold value.

14. A device for determining a location of a portable handheld device in an indoor space, the device comprising:
    memory storing a map of an indoor space, the map being based on a plurality of constraints;
    a processor coupled to the memory, the processor being operable to:
    generate a first set of particles, each particle of the first set of particles representing a location on the map and being associated with a likelihood value;
    receive data generated by an orientation device;
    determine a direction and speed of movement based on the received data;
    apply the direction and speed of movement to each one of the first set of particles;
    adjust the likelihood value of each particular particle of the first set of particles, based on whether the particular particle violated one or more of the plurality of constraints;
    generate a second set of particles based on the likelihood values associated with the first set of particles;

select a particular particle of the second set of particles closest to an average representative location of the second set of particles when if all of the particles of the second set of particles are within a threshold radius of one another; and identify an actual location of the portable handheld device in the indoor space based on a representative location of the selected particle.

15. The device of claim 14, wherein the plurality of constraints are walls which define areas where a user may not walk.

16. The device of claim 14, wherein the plurality of constraints are rails which define areas where a user is permitted to walk.

17. The device of claim 14, wherein each particle of the first set of particles further represents a device heading, and the processor is further operable to:

identify a heading based on the received data; and adjust the likelihood value of each particular particle of the first set of particles based on whether the heading associated with each particular particle is associated with a heading consistent with the identified heading.

18. The device of claim 14, wherein the processor is further operable to determine the direction and speed of movement based on the received data is further based on using the accelerometer as a pedometer.

19. The device of claim 14, wherein the first set of particles and the second set of particles each includes the same number of particles.

20. The device of claim 14, wherein the processor is further operable to generate the second set of particles by:

selecting particles of the first set of particles based on the likelihood values associated with the first set of particles; and adjusting the representative locations of the selected particles by a minimal value.

21. The device of claim 20, wherein each particle of the first set of particles further represents a device heading, and the processor is further operable to:

identify a heading based on the received data; and adjust the likelihood value of each one of the first set of particles based on whether the heading associated with each particle is associated with a heading consistent with the identified heading and wherein the second set of particles is generated by adjusting each of the representative headings of the selected particles of the first set of particles by a minimal heading value.

* * * * *